(12) United States Patent
Feng et al.

(10) Patent No.: US 6,674,929 B2
(45) Date of Patent: Jan. 6, 2004

(54) TUNABLE OPTICAL FILTER

(75) Inventors: Dazeng Feng, Arcadia, CA (US); Wenhua Lin, Pasadena, CA (US)

(73) Assignee: Lightcross, Inc., Monterey Park, CA (US)

( * ) Notice: Subject to any disclaimer, the term of this patent is extended or adjusted under 35 U.S.C. 154(b) by 139 days.

(21) Appl. No.: 09/872,472

(22) Filed: Jun. 1, 2001

(65) Prior Publication Data

US 2002/0181832 A1 Dec. 5, 2002

(51) Int. Cl.[7] .............................. G02B 6/26; G02B 6/42
(52) U.S. Cl. ......................... 385/15; 385/24; 385/27; 385/33; 385/14; 398/85
(58) Field of Search ....................... 385/33, 15, 27, 385/24, 14; 398/85

(56) References Cited

U.S. PATENT DOCUMENTS

| | | | |
|---|---|---|---|
| 4,618,210 A | 10/1986 | Kondo ..................... | 350/96.14 |
| 4,747,654 A | 5/1988 | Yi-Yan ..................... | 350/96.19 |
| 4,813,757 A | 3/1989 | Sakano et al. ........... | 350/96.14 |
| 4,846,542 A | 7/1989 | Okayama et al. ........ | 350/96.15 |
| 5,002,350 A | 3/1991 | Dragone ................... | 350/96.15 |
| 5,013,113 A | 5/1991 | Soref ....................... | 350/96.13 |
| 5,039,993 A | 8/1991 | Dragone ................... | 343/776 |
| 5,243,672 A | 9/1993 | Dragone ................... | 385/46 |
| 5,412,744 A | 5/1995 | Dragone ................... | 385/24 |
| 5,450,511 A | 9/1995 | Dragone ................... | 385/37 |
| 5,467,418 A | 11/1995 | Dragone ................... | 385/37 |
| 5,488,500 A * | 1/1996 | Glance ..................... | 359/127 |
| 5,542,010 A * | 7/1996 | Glance et al. ............ | 385/14 |
| 5,581,643 A | 12/1996 | Wu .......................... | 385/17 |
| 5,706,377 A | 1/1998 | Li ............................ | 385/37 |
| 5,841,931 A | 11/1998 | Foresi et al. ............. | 385/131 |
| 5,938,811 A | 8/1999 | Greene .................... | 65/385 |
| 5,991,477 A * | 11/1999 | Ishikawa et al. ......... | 385/24 |
| 6,021,242 A * | 2/2000 | Harumoto et al. ....... | 385/37 |
| 6,108,478 A | 8/2000 | Harpon et al. ........... | 385/129 |
| 6,118,909 A | 9/2000 | Chen et al. ............... | 385/15 |
| 6,256,428 B1 * | 7/2001 | Norwood et al. ........ | 385/17 |
| 6,272,270 B1 | 8/2001 | Okayama .................. | 385/46 |
| 6,337,937 B1 * | 1/2002 | Takushima et al. ...... | 385/28 |
| 6,486,984 B1 * | 11/2002 | Baney et al. ............. | 359/124 |
| 6,542,666 B2 * | 4/2003 | Tsuda et al. .............. | 385/37 |
| 6,546,167 B1 * | 4/2003 | Chen et al. ............... | 385/24 |
| 6,549,328 B2 * | 4/2003 | Aoki et al. ............... | 359/308 |
| 2002/0186928 A1 * | 12/2002 | Curtis ...................... | 385/37 |

FOREIGN PATENT DOCUMENTS

| | | | | |
|---|---|---|---|---|
| EP | 0647861 A1 | | 4/1995 | ........... G02B/6/12 |
| EP | 0985942 A2 | | 3/2000 | ........... G02B/6/293 |
| JP | 63-197923 | | 8/1988 | ........... G02F/1/31 |
| JP | 2-179621 | | 7/1990 | ........... G02F/1/313 |
| JP | 6-186598 | | 7/1994 | ........... G02F/1/313 |
| WO | WO 9407178 A1 | * | 3/1994 | ........... G02F/1/313 |

OTHER PUBLICATIONS

U.S. patent application Publication 2002/0159141 A1; Choa, Fow–Sen; Widely Tunable And Integrated Optical System And Method; Oct. 31, 2002.*

(List continued on next page.)

Primary Examiner—Brian Healy
Assistant Examiner—Daniel Petkovsek
(74) Attorney, Agent, or Firm—Law Offices of Travis L. Dodd, P.C.

(57) ABSTRACT

An optical filter system is disclosed. The optical filter system includes a first filter configured to output light signals having wavelengths falling within a plurality of periodically spaced wavelength bands. A second filter in optical communication with the first filter and being configured to output light signals having wavelengths falling within a plurality of periodically spaced bands. The period of the bands associated with the first filter is different than the period of the bands associated with the second filter.

42 Claims, 16 Drawing Sheets

OTHER PUBLICATIONS

Doerr, C. R. et al., *2×2 Waveength–Selective Cross Connect Capable of Switching 128 Channels in Sets of 8*, PD8, pp. 1–3.

Doerr, C. R. et al., *Automatic Wavelength Channel–By–Channel Equalizer*, PD20, pp. 227–229.

Kostrzewa, C. et al., *Tunable Polymer Optical Add/Drop Filter for Multiwavelength Networks*, IEEE Photonics Technology Letters, vol. 9, No. 11, Nov. 1997, pp. 1487–1489.

Okayama, H. et al, *Node Comprising Tunable Gratings*, Electronics Letters, $8^{th}$ May 1997, vol. 33, No. 10, pp. 881–882.

Roeloffzen, C. G. H. et al., *Tunable Passband Flattened 1–from–16 Binary–Tree Structured Add–After–Drop Multiplexer Using SiON Waveguide Technology*, IEEE Photonics Technology Letters, vol. 12, No. 9, Sep. 2000, pp. 1201–1203.

Zirngibl, M. et al., *Digitally Tunable Channel Dropping Filter/Equalizer Based on Waveguide Grating Router and Optical Amplifier Integration*, IEEE Photonics Technology Letters, vol. 6, No. 4, Apr. 1994, pp. 513–515.

Abe, et al., *Optical Path Length Trimming Technique using Thin Film Heaters for Silica–Based Waveguides on Si*, Electronics Letters , Sep. 12, 1996, vol. 32–No. 19, pp. 1818–1820.

Albert, J., *Planar Fresnel Lens Photoimprinted in a Germanium–Doped Silica Optical Waveguide*, Optics Letters, May 15, 1995, vol. 20–No. 10, pp 1136–1138.

Aman, M.C., *Calculation of Metal–Clad Ridge–Waveguide (MCRW) Laser Modes by Mode Coupling Technique*, Journal of Lightwave Technology, vol. LT–4, No. 6, Jun. 1986, p. 689–693.

Amann, M.C. et al, *Calculation Of The Effective Refractive–Index Step For The Metal–Cladded–Ridge–Waveguide Laser*, Applied Optics, vol. 20, No. 8, Apr. 15, 1981, p. 1483–1486.

Baba, S. et al., *A Novel Integrated–Twin–Guide (ITG) Optical Switch with a Built–in TIR Region*; IEEE Photonics Technology Letters; vol. 4, No. 5, May 1992, p. 486–488.

Benson, T.M., *Etched–Wall Bent–Guide Structure for Integrated Optics in the III–V Semiconductors*; Journal of Lightwave Technology, vol. LT–2, No. 1, Feb. 1984; p. 31–34.

Berry, G.M. et al., *Analysis Of Multiplayer Semiconductor Rib Waveguides With High Refractive Index Substrates*, Electronics Letters; vol. 29, No. 22; Oct. 28, 1993, p. 1941–1942.

Betty, I. et al., *A Robust, Low–Crosstalk, InGaAsP/InP Total–Internal–Reflection Switch For Optical Cross–Connect Application*.

Burke, S.V., *Spectral Index Method Applied to Coupled Rib Waveguides*; Electronics Letters, vol. 25, No. 9, Apr. 27, 1989; p. 605–606.

Burns, W.K. et al., *Mode Conversion in Planar–Dielectric Separating Waveguides*; IEEE Journal of Quantum Electronics, vol. QE–11, No. 1, Jan. 1975; p. 32–39.

Cai, Y. et al., *A Novel Three–Guide Optical Coupler Using A Taper–Formed Waveguide*; j. Appl. Phys 69(5), Mar. 1991; p. 2810–2814.

Cavailles, J.A. et al., *First Digital Optical Switch Based on InP/GaInAsP Double Heterostructure Waveguides*; Electronics Letters, vol. 27, No. 9, Apr. 25, 1991, p. 699–700.

Chen, R.T. et al., *Design and Manufacturing of WDM Devices*; Proceedings of SPIE vol. 3234.

Clemens, et al., *Wavelength–Adaptable Optical Phased Array in $SiO_2$–Si*, Photonics Technology Letters, Oct. 1995, vol. 7–No. 10, 1040–1041.

Dagli, N. et al., *Analysis of Rib Dielectric Waveguides*; IEEE Journal of Quantum Electronics, vol. QE–21, No. 4, Apr. 1985, p. 315–321.

Dagli, N. et al., *Theoretical and Experimental Study of the Analysis and Modeling of Integrated Optical Components; IEEE Journal of Quantum electronics*, vol. 24, No. 11, Nov. 1988; p. 2215–2226.

Deri, R.J., et al., Low–Loss GaAs/AIGaAs Waveguide Phase Modulator Using A W– Shaped Index Profile; Sep. 6, 1988.

Deri, R.J., et al., *Low–Loss Multiple Quantum Well GaInAs/InP Optical Waveguides*; Feb. 21, 1989.

Devaux, F. et al., *20Gbit/s Operation of a High–Efficiency InGaAsP/InGaAsP MQW Electroabsorption Modulator With 1.2–V Drive Voltage*; IEEE Photonics Technology Letters, vol. 5, No. 11, Nov. 1993, p. 1288–1290.

Doerr, C.R. et al., *Chirping Of The Waveguide Grating Router For Free–Spectral–Range Mode Selection In The Multifrequency Laser*, IEEE Photonics Technology Letters, Apr. 1996, vol. 8–No. 4, pp 500–502.

Doerr, C.R. et al., *Chromatic Focal lane Displacement in the Parabolic Chirped Waveguide Grating Router*, May 1997, vol. 9–No. 5, pp 625–627.

Dragone, c. *Efficient N×N Star Couplers Using Fourier Optics*, pp 479–48, Mar. 1989, vol. 7–No. 3, Journal of Lightwave Technology.

Fischer, et al., *Singlemode Optical Switches Based on SOI Waveguides with Large Cross–Section*, Electronics Letters, Mar. 3, 1994, vol. 30–No. 5, pp. 406–408.

Fischer, K. et al, *Sensor Application Of SiON Integrated Optical Waveguides On Silicon*; Elevier Sequoia, 1992; p. 209–213.

Fish, G. et al., *Monolithic InP Optical Crossconnects: 4×4 and Beyond*, JWB2–1, p. 19–21.

Furuta, H. et al, *Novel Optical Waveguide For Integrated Optics*, Applied Optics, vol. 13, No. 2, Feb. 1974, p. 322–326.

Gini, E. et al., *Low Loss Self–Aligned Optical Waveguide Corner Mirrors in InGaAsP/InP*, We P2.22.

Goel, K. et al *Design Considerations for Low Switching Voltage Crossing Channel Switches*; Journal of Lightwave Technology, vol. 6, No. 6, Jun. 1988; p. 881–886.

Granestrand, P. et al., *Integrated Optics 4×4 Switch Matrix with Digital Optical Switches*; Electronics Letters, vol. 26, No. 1, Jan. 4, 1990; p. 4–5.

Himeno, A. et al., *Loss Measurement and Analysis of High–Silica Reflection Bending Optical Waveguides*, Journal of Lightwave Techology, Jan. 1988, vol. 6–No. 1, 41–46.

Hsu, K.Y. et al., *Photonics devices and Modules*, www.c-c.nctu.edu.tw/~ctr/lee_mti/research_topic/photonic_devices_modules.htm, pp 1–3.

Huang, T.C. et al., *Depletion Edge Translation Waveguide Crossing Optical Switch*; IEEE Photonics Technology Letters; vol. 1, No. 7, Jul. 1989, p. 168–170.

Hutcheson, L.D. et al., *Comparison of Bending Losses in Integrated Optical Circuits*; Optics Letters, vol. 5, No. 6, Jun. 1980, p. 360–362.

Inoue, H. et al, *Low Loss GaAs Optical Waveguides*, Journal of Lightwave Technology, vol. LT–3, No. 6, Dec. 1985; p. 204–209.

Irace, A. et al., *Fast Silicon–on–Silicon Optoelectronic Router Based on a BMFET Device*, Journal of Selected Topics on Quantum Electronics, Jan./Feb. 2000, vol. 6–No. 1, pp. 14–18.

Ito, F. et al., *Carrier–Injection–Type Optical Switch In GaAs With A 1.06–1.55 μm Wavelength Range*; Appl. Physics Letters, 54(2) Jan. 9, 1989; p. 134–136.

Jackman, N. et al., *Optical Cross Connects for Optical Networking*; Bell Labs Technical Journal, Jan.–Mar. 1999; p. 262–281.

Johnston, I.R., et al., *Silicon–Based Fabrication Process For Production Of Optics Waveguides*; IEE Proc–Optoelectron., vol. 143, No. 1, Feb. 1996, p. 37–40.

Kaenko, A. et al., *Athermal Silica–based Arrayed–waveguide Grating (AWG) Multiplexers with New Low Loss Groove Design*; TuO1–1, p. 204–206.

Kasahara, R. et al., *Low–Power Consumption Slica–Based 2×2 Thermooptic Switch Using Trenched Silicon Substrate*, IEEE Photonics Technology Letters, vol. 11, No. 9, Sep. 1999, p. 1132–1134.

Khan, M.N. et al., *Fabrication–Tolerant, Low–Loss, and High–Speed Digital Optical Switches in InGaAsP/InP Quantum Wells*; Proc $21^{st}$ Eur.Conf.on Opt.Comm.(ECOC '95–Brussels), p. 103–106.

Khan, M.N. et al., *High–Speed Operation of Quantum Well Electron Transfer Digital Optical Switches*; p. 102–102c.

Kirihara, T. et al., *Lossless And Low Crosstalk 4×4 Optical Switch Array; Electronics And Communications In Japan*, Part 2, vol. 77, No. 11, 1994, p. 73–81.

Kirihara, T. et al., *Lossless and Low–Crosstalk Characteristics in an InP–Based 2×2 Optical Switch*, IEEE Photonics Technology Letters, vol. 5, No. 9 Sep. 1993, p. 1059–1061.

Kokubun, Y. et al., *Athermal Waveguides for Temperature–Independent Lightwave Devices*, Nov. 1993, 1297–1298, vol. 5–No. 11, IEEE Photonics Technology Letters.

Kokubun, Y. et al., *Temperature–Independent Narrowband Optical Filter at 1.3 μm Wavelength by an Athermal Waveguide*, $10^{th}$ Oct. 1996, vol. 32–No. 21, Electronics Letters.

Kokubun, Y. et al., *Temperature–Independent Optical Filter at 1.55 μm Waveguide Using a Silica–Based Athermal Waveguide*, Feb. 19, 1998, vol. 34–No. 4, Electronics Letters.

Kokubun, Y. et al., *Three–Dimensional Athermal Waveguides for Temperature Independent Lightwave Devices*, $21^{st}$ Jul. 1994, vol. 30–No. 15, Electronics Letters.

Kostrzewa, C. et al., *Tunable Polymer Optical Add/Drop Filter for Multiwavelength Networks*, Photonics Technology Letters, Nov. 1997, vol. 9–No. 11, 1487–1489.

Laakman, K. D. et al., *Waveguides: Characteristic Modes Of Hollow Rectangular Dielectric Waveguides*; Applied Optics, vol. 15, No. 5, May 1976; p. 1334–1340.

Lee, T.P. et al., *$Al_xGa_{1-x}As$ Double–Heterostructure Rib–Waveguide Injection Laser*; IEEE Journal of Quantum Electronics; vol. QE–11, No. 7, Jul. 1975; p. 432–435.

Liu, Y.L. et al., *Silicon 1×2 Digital Optical Switch Using Plasma Dispersion*; Electronics Letters, vol. 30, No. 2, Jan. 20, 1994; p. 130–131.

Mak, G. et al., *High–Speed Bulk InGaAsP–InP Electroabsorption Modulators with Bandwidth in Excess of 20 GHz*, IEEE Photonics Technology Letter, vol. 2, No. 10, Oct. 1990, p. 730–733.

Marcatili, E., *Improved Coupled–Mode Equations for Dielectric Guides*; IEEE Journal of Quantum Elecronics, vol. QE–22, No. 6, Jun. 1986; p. 988–993.

Marcatili, E.A.J., *Bends in Optical Dielectric Guides*; The Bell System Technical Journal, Sep. 1969; p. 2103–2132.

Marcatili, E.A.J., *Dielectric Rectangular Waveguide and Directional Coupler for Integrated Optics*, The Bell System Technical Journal, Sep. 1969 p. 2071–2101.

Marcatili, E.A.J., *Slab–Coupled Waveguides*; The Bell System Technical Journal, Apr. 1974; American Telephone & Telegraph Company, vol. 53, No. 4, Apr. 1974.

Mirza, A.R. et al, *Silicon Wafer Bonding for MEMS Manufacturing*, Solid State Technology, Aug. 1999, p. 73–78.

Moerman, I. et al., *A Review on Fabrication Technologies for the Monolithic Integration of Tapers with III–V Semiconductor Devices*; IEEE Journal of Selected Topics in Quantum electronics, vol. 3, No. 6, Dec. 1997, p. 1308–1320.

Müller, G. et al., *First Low Loss InP/InGaAsP Optical Switch with Integrated Mode Transformers*; ThC12.10; p. 37–40.

Nayyer, J. et al., *Analysis of Reflection–Type Optical Switches with Intersecting Waveguides*, Journal of Lightwave Technology, vol. 6, No. 6, Jun. 1988; p. 1146–1152.

Negami, t. et al., *Guided–Wave Optical Wavelength Demultiplexer Using An Asymmetric Y Junction*; Appl. Phys. Lett. 54 (12), Mar. 20, 1989, p. 1080–1082.

Nelson, W. et al., *Optical Switching Expands Communications–Network Capacity*; Laser Focus World, Jun. 1994, p. 517–520.

Nelson, W.H. et al., *Wavelength–and Polarization–Independent Large Angle InP/InGaAsP Digital Optical Switches with Extinction Ratios Exceeding 20 dB*; IEEE Photonics Technology Letters, vol. 6, No. 11, Nov. 1994; p. 1332–1334.

Noda, Y. et al., *High–Speed Electroabsorption Modulator with Strip–Loaded GaInAsP Planar Waveguide*; Journal of Lightwave Technology, vol. LT–4, No. 10, Oct. 1986, p. 1445–1453.

Offrein, B.J. et al., *Resonant Coupler–Based Tunable Add–After–Drop Filter in Silicon–Oxynitride Technology of WDM Networks*, Journal of Selected Topics in Quantum Electronics, vol. 5–No. 5, 1400–1405.

Okamoto, K. et al., *Arrayed–Waveguide Grating Multiplexer With Flat Spectral Response*; Optics Letters, Jan. 1, 1995; vol. 20, No. 1; p. 43–45.

Okamoto, K. et al., *Flat Spectreal Response Arrayed–Waveguide Grating Multiplexer with Parabolic Waveguide Horns*, Electronics Letters Online, Jul. 15, 1996, No. 19961120, pp. 1661–1662.

Okayama, H. et al., *8×8 $Ti:LiNbO_3$ Waveguide Digital Optical Switch Matrix*: IEICE Trans. Commun.; vol. E77–B, No. 2; Feb. 1944; p. 204–208.

Okayama, H. et al., *Dynamic Wavelength Selective Add/Drop Node Comprising Tunable Gratings, Electronics Letters Online*, Apr. 10, 1997, No. 19970607.

Okayama, H. et al., *Reduction of Voltage–Length Product for Y–Branch Digital Optical Switch*, Journal of Lightwave Technology, vol. 11, No. 2, Feb. 1993; p. 379–387.

Okuno, M. et al., *Strictly Nonblocking 16×16 Matrix Switch Using Silica Based Planar Lightwave Circuits*, vol. 10, No. 266, Sep. 11, 1986.

Ooba, N. et al., *Athermal Silica–Based Arrayed–Waveguide Grating Multiplexer Using Bimetal Plate Temperature Compensator*, Electronics Letters, $12^{th}$ Oct. 2000, vol. 36, No. 21, pp. 1800–1801.

Renaud, M. et al., *Compact Digital Optical Switches for Low Insertion Loss Large Switch Arrays on InP*; Proc. $21^{st}$ Eur.Conf.on Opt. Comm. (ECOC '95–Brussels), p. 99–102.

Rickman, A.G. et al., *Silicon–on–Insulator Optical Rib Waveguide Loss and Mode Characteristics*, Journal of Lightwave Technology, Oct. 1994, vol. 12–No. 10, pp. 1771–1776.

Rolland, C. et al., *10 Gbit/s, 1.56 μm, Multiquantum Well InP/InGaAsP Mach–Zehnder Optical Modulator*; Electronics Letters, Mar. 4, 1993, vol. 29, No. 5, p. 471–472.

Santec Sales Brochure for year 2000 entitled "Optical Components".

Schauwecker, B. et al, *Small–Size Silicon–Oxynitride AWG Demultiplexer Operating Around 725 nm*, IEEE Photonics Technology Letters, vol. 12 No. 12, Dec. 2000.

Schlachetzki, A. *Monolithic IO–Technology–Modulators and Switches Based on InP*; SPIE vol. 651 Integrated Optical Circuit Engineering III (1986), p. 60–86.

Silberberg, Y. et al., *Digital Optical Switch*; Appl. Phys. Lett.; vol. 51, No. 16, Oct. 19, 1987, p. 152–154.

Smit, M.K., *New Focusing and Dispersive Planar Component Based on an Optical Phased Array*; Electronics Letters; Mar. 31, 1988, vol. 24, No. 7; p. 385–386.

Smith, S.D. et al., *CW Operation of Corner Cavity Semiconductor Lasers*; IEEE Photonics Technology Letters, vol. 5, No. 8, Aug. 1993; p. 876–879.

Sneh, A. et al., *Compact Low Crosstalk and Low Propagation Loss Quantum–Well Y–Branch Switches*; PDP 4–1 ~ 4–5.

Soole, J.B.D. et al., *Use of Multimode Interference Couplers to Broaden the Passband of Wavelength–Dispersive Integrated WDM Filters*; IEEE Photonics Technology Letters, vol. 8, No. 10, Oct. 1996; p. 1340–1342.

Stoll, L. et al., *1:8 Optical Matrix Switch on InP/InGaAsP with Integrated Mode Transformers*; Optical Switches and Modulators II, p. 531–534.

Stoll, L. et al., Compact and Polarization Independent Optical Switch on InP/InGaAsP: TuB7.2; p. 337–340.

Stutius, W. et al, *Silicon Nitride Films On Silicon For Optical Waveguides*, Applied Optics, vol. 16, No. 12, Dec. 1977, p. 303–307.

Sugie, T. et al., *1.3–μm Laser Diodes with a Butt–jointed Selectively Grown Spot–Size Converter*; ThB2–6, IOOC95, p. 52–53.

Tada, K. et al., *Bipolar Transistor Carrier–Injected Optical Modulator/Switch: Proposal and Analysis*, IEEE Electron Device Letters, vol. EDL–7, No. 11, Nov. 1986, p. 605–606.

Takada, et al., *Optical Spectrum analyzer using Cascaded AWG's with Different Channel Spacings*, Photonics Technology Letters, Jul. 1999, vol. 11, No. 7, pp. 863–864.

Takahashi, H. et al., *Arrayed Waveguide Grating for Wavelength Division Multi/Demultilexer with Nanometre Resolution*, PWG–NTT–7.

Takiguchi, K. et al, *Dispersion Compensation Using a Planar Lightwave Circuit Optical Equalizer*, Photonics Technology Letters, Apr. 1994, vol. 6, No. 4, pp. 561–564.

Tien, P.K. et al., *Formation of Light–Guided Interconnections in an Integrated Optical Circuit by Composite Tapered–Film Coupling*; Applied Optics, vol. 12, No. 8, Aug. 1973; p. 1909–1916.

Toyoda et al., *Thermoplastic Switch and Wavelength Tunable Filter using Polymer Waveguides*, Abstract of paper presented at Opticomm 2001 on Aug. 22, 2001.

Treyz, G.V. et al., *Silicon Optical Modulators at 1.3 μm Based on Free–Carrier Absorption*; IEEE Electron Device Letters, vol. 12, No. 6, Jun. 1991; p. 276–278.

Tsuda, H. et al., *Performance Analysis of a Dispersion Compensator Using Arrayed–Waveguide Gratings*, Journal of Lightwave Technology, Aug. 2000, vol. 18–No. 8, pp. 1139–1147.

Tsude, H. et al., *Second– and Third–Order Dispersion Compensator Using a High–Resolution Arrayed Waveguide Grating*, IEEE Photonics Technology Letters, May 1999, vol. 11–No. 5, 569–571.

Vinchant et al, *InP 4×4 Digital–Optical–Switch Module For Multiwavelength Cross–Connect Applications*; OFC '95 Technical Digest, Thursday ThK2, p. 281–282.

Vinchant, J.F. et al., *First Polarisation insensitive 4×4 Switch matrix on InP with Digital Optical Switches*, TuB7.3, p. 341–344.

Vinchant, J.F. et al., *InP Digital Optical Switch: Key Element for Guided– Wave Photonic Switching*; IEE Proceedings–J, vol. 140, No. 5, Oct. 1993; p. 301–307.

Vinchant, J.F. et al., *Low Driving Voltage or Current Digital Optical Switch on InP for Multiwavelength System Applications*; Electronics Letters, vol. 28, No. 12, Jun. 4, 1992; p. 1135–1137.

Wakita, K. et al., *Long Wavelength Waveguide Multiple Quantum Well Optical Modulators*; IEEE Journal of Quantum Electronics, vol. QE–23, No. 12, Dec. 1987, p. 2210–2215.

Wanru, Z. et al, *Total Internal Reflection Optical Switch with Injection Region Isolated by Oxygen Ion Implantation*; p. 1–10.

Yamada, et al., *Cross Talk Reduction in a 10 GHz Spacing Arrayed–Waveguide Grating by Phase–Error Compensation*, Journal of Lightwave Technology, Mar. 1998, vol. 16–No. 3, pp. 364–371.

Yanagawa, H. et al., *Polarization–and Wavelength–Insensitive Guided–Wave Optical Switch with Semiconductor Y Junction*; Journal of Lightwave Technology, vol. 8, No. 8, Aug. 1990, p. 1192–1197.

Yu, S. et al., *High Speed All–Optical Packet Routing Using A Vertical Coupler Crosspoint Space Switch*.

Yu, S. et al, *Ultralow Cross–Talk, compact integrated optical crosspoint space switch arrays employing active InGaAsP/InP Vertical Waveguide Couplers*, Integrated Optical Crosspoint Switch Arrays, Siyuan Yu et al, CPD24–2.

Zengerle, R. et al., *Tapered Twin Waveguides For Spot–Size Transformation In InP*; TheB2–5; IOOC 95; p. 50–51.

Zirngibl, M. et al., *Digitally Tunable Laser Based On The Integration Of A Waveguide Grating Multiplexer And An Optical Amplifier*, IEEE Photonics Technology Letters, Apr. 1994, vol. 6–No. 4, pp. 516–517.

Zucker, J.E. et al., *Strained Quantum Wells for Polarization–Independent Electrooptic Waveguide Switches*, Journal of Lightwave Technology, vol. 10, No. 12, Dec. 1992, p. 1926–1930.

\* cited by examiner

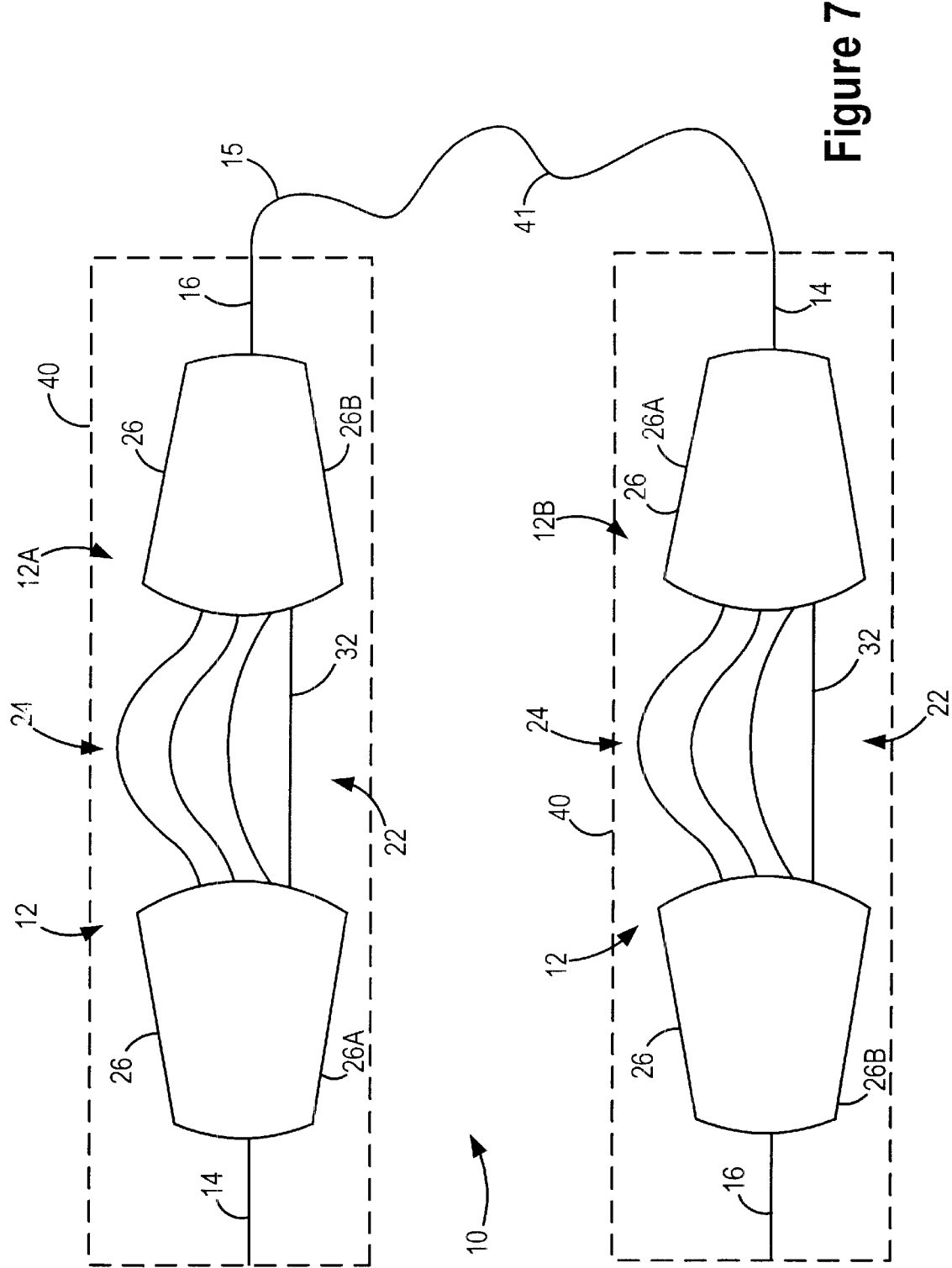

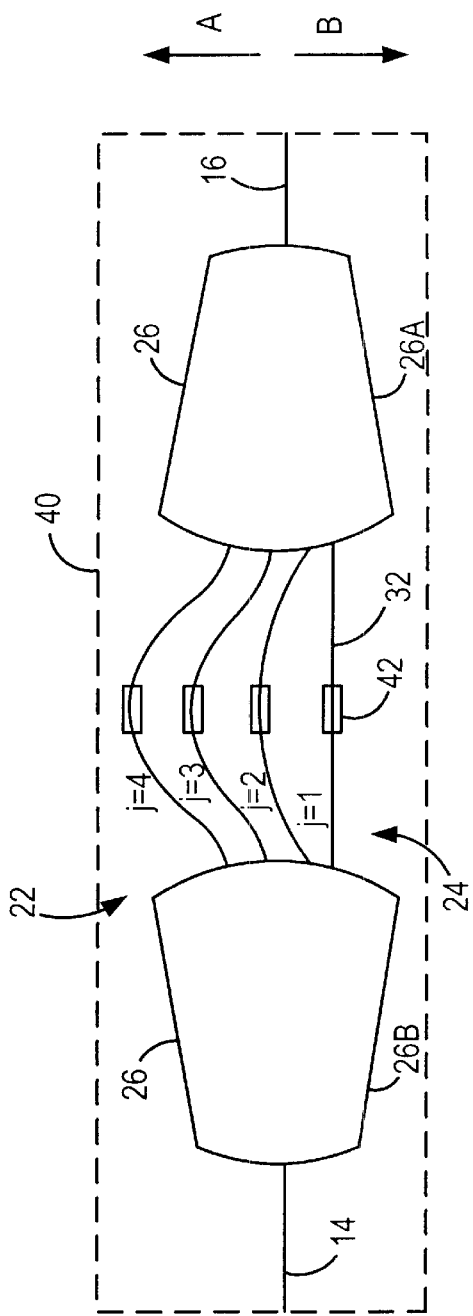
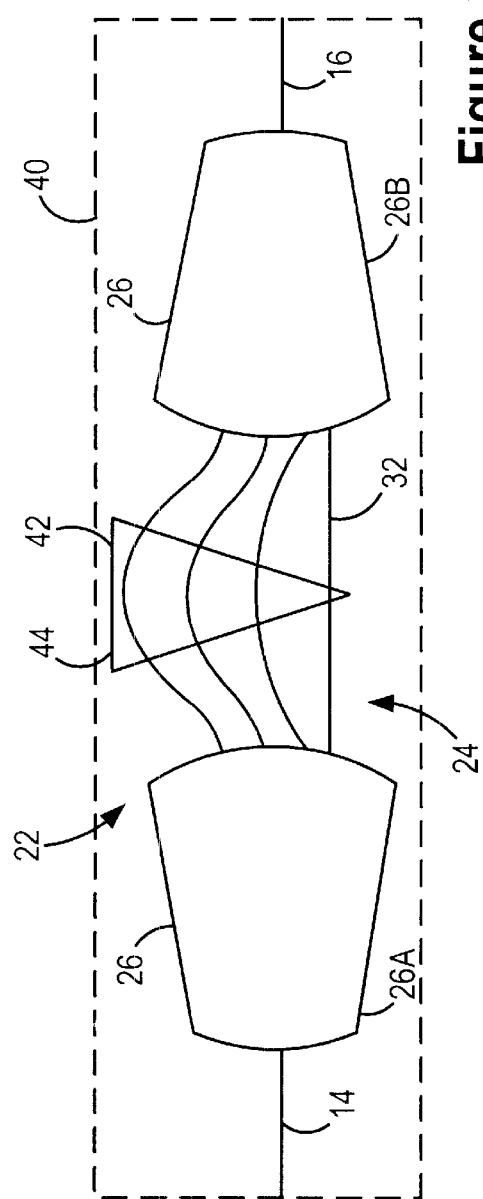

TUNABLE OPTICAL FILTER

RELATED APPLICATIONS

This application is related to U.S. patent application Ser. No. 09/845,685; filed on April 30, 2001; entitled "Tunable Filter" and incorporated herein in its entirety.

BACKGROUND

1. Field of the Invention

The invention relates to optical networking components. In particular, the invention relates to optical filters.

2. Background of the Invention

Optical networks often include optical fibers for carrying light signals having a plurality of channels. Each of the channels is generally associated with a particular wavelength or a particular range of wavelengths. These networks typically employ optical filters for filtering light signals having particular wavelengths from a multichannel light signals. The range of wavelengths that is filtered by a particular optical filter is called the bandwidth of the optical filter.

A tunable filter is a variety of optical filter that allows the band of wavelengths that is filtered to be tuned. The turning range of most tunable filter is not wide enough to cover C or L band, and the bandwidth of many tunable filters changes as the filter is tuned. As a result, the performance of the optical filter is inconsistent across the tuning range of the optical filter. Further, many optical filters have undesirably large power requirements.

For the above reasons, there is a need for a tunable optical filter having a wide turning range. There is also a need for a tunable optical filter having a bandwidth that is substantially stable through the tuning range of the filter and/or that has reduced power requirements.

SUMMARY OF THE INVENTION

The invention relates to an optical filter system. The optical filter system includes a first filter configured to output light signals having wavelengths falling within a plurality of periodically spaced wavelength bands. A second filter is in optical communication with the first filter and is configured to output light signals having wavelengths falling within a plurality of periodically spaced bands. The period of the bands associated with the first filter is different than the period of the bands associated with the second filter.

In some instances, the selection of wavelengths that fall within the wavelength bands of the first filter is tunable while the selection of wavelengths that fall within the wavelength bands of the second filter is not tunable. In yet another embodiment, the selection of wavelengths that fall within the wavelength bands of the first filter is tunable and the selection of wavelengths that fall within the wavelength bands of the second filter is tunable.

In another embodiment of the system, the first filter is configured to output light signals having wavelengths falling within one or more wavelength bands. The wavelengths that fall within the one or more bands is tunable. A second filter in optical communication with the first filter and is configured to output light signals having wavelengths falling within a plurality of periodically spaced wavelength bands.

The system can be configured such that the first filter receives the light signals output by the second filter or such that the second filter receives the light signals output by the first filter.

In some instances, the width of the bands of the first filter is different from the width of the bands of the second filter.

In one embodiment of the invention, an optical fiber connects an optical component having the first filter to an optical component having the second filter. The optical fiber providing optical communication between the first filter and the second filter. Alternatively, the first filter and the second filter are positioned on the same optical component.

In another embodiment of the invention, the first filter includes a first array waveguide grating having a plurality of first array waveguides. At least a portion of the first array waveguides can include an effective length tuner for changing the effective length of an array waveguide. In some instances, an end of each first array waveguide includes a reflector for reflecting a light signal traveling toward the reflector along the first array waveguide back into the first array waveguide. Additionally or alternatively, the second filter can include a second array waveguide grating having a plurality of second array waveguides. At least a portion of the second array waveguides can include an effective length tuner for changing the effective length of an array waveguide. In some instances, an end of each second array waveguide includes a reflector for reflecting a light signal traveling toward the reflector along the second array waveguide back into the second array waveguide.

In one embodiment, the first filter includes a first array waveguide grating connected to a light distribution component and the second filter includes a second array waveguide grating connected to the light distribution component. In some instances, a transition waveguide connects one region of the light distribution component to another region of the light distribution component.

The invention also relates to a method of operating an optical filter system. The method includes selecting a target wavelength to be produced by an optical filter system. The optical filter system has a first filter in optical communication with a second filter. The first filter is configured to output light signals having wavelengths falling within one or more wavelength bands. The second filter is configured to output light signals having wavelengths that overlap with the target wavelength. The method also includes tuning the first filter such that a band of the first filter overlaps with the target wavelength.

Another embodiment of the method includes selecting a target wavelength to be produced by the optical filter system. The system having a first filter in optical communication with a second filter. The first filter is configured to output light signals having wavelengths falling within one or more bands. The second filter is configured to output light signals having wavelengths that fall within one or more bands. The method also includes tuning the first filter such that a band of the first filter overlaps with the target wavelength. The method further includes tuning the second filter such that a band of the second filter overlaps with the target wavelength.

The system can be configured such that the first filter can be configured to receive the light signals output by the second filter or the second filter can be configured to receive the light signals output by the first filter.

BRIEF DESCRIPTION OF THE FIGURES

FIG. 7 illustrates an optical filter system constructed using the filters of FIG. 6.

FIG. 8A illustrates a filter that is suitable for use as a first filter component and/or a second filter component. The filter includes an array waveguide grating having a plurality of array waveguides. At least a portion of the array waveguides include an effective length tuner for tuning the effective length of a array waveguide.

FIG. 8B illustrates a filter that is suitable for use as a first filter component and/or a second filter component. The filter includes an array waveguide grating having a plurality of array waveguides. An effective length tuner is configured to tune the effective length of the array waveguides.

DETAILED DESCRIPTION OF THE PREFERRED EMBODIMENT

The invention relates to an optical filter system. The optical filter system includes a first periodic filter in optical communication with a second periodic filter. A periodic filter is configured to output light signals having wavelengths falling within a plurality of periodically spaced bands. The period of the bands associated with the first filter is different than the period of the bands associated with the second filter.

The first filter and/or the second filter are tunable in that the selection of waveguides in a band can be tuned. The optical filter system outputs light signals having a target wavelengths when the bands of the first filter and the bands of the second filter each include the target wavelength. As a result, the system can be tuned to the target wavelength by tuning the first filter and/or the second filter such that the bands of the first filter and the bands of the second filter overlap at the target wavelength. Because the period of the bands associated with the first filter is different than the period of the bands associated with the second filter, the bands of the first filter and the bands of the second filter do not substantially overlap at wavelengths other than the target wavelength. As a result, the system will output only the target wavelength.

The period of the first filter and the second filter can be less than the desired tuning range of the optical filter system. As a result, the bands of the first filter and the bands of the second filter can be made to overlap at any target wavelength within the desired tuning range of the optical system by tuning the first filter and/or the second filter over a range that is smaller than the desired tuning range of the optical filter system. Further, reducing the period of the first filter and/or the second filter reduces the tuning range required by the first filter and/or the second filter. As a result, the first filter and/or the second filter need only a small tuning range to provide the optical filter system with the desired tuning range.

Because the tuning range of the first filter and/or the second filter is reduced, the power requirements of the optical filter system are reduced. Additionally, tuning of the first filter and/or the second filters over a small range does not substantially affect the bandwidth of the optical filters. This is true even when conventional filters are used in the optical filter system. As a result, the optical filter system does not show substantial changes to the bandwidth over the tuning range of the optical filter system.

Additionally, the narrow tuning range required by the first filter and/or the second filter allows the first filter and/or the second filter to be array waveguide grating based filters. These filters are associated with a negligible change in bandwidth over their tuning range. As a result, the use of these filters allows the change in bandwidth associated with the optical filter system to be further reduced.

Figure 1A:
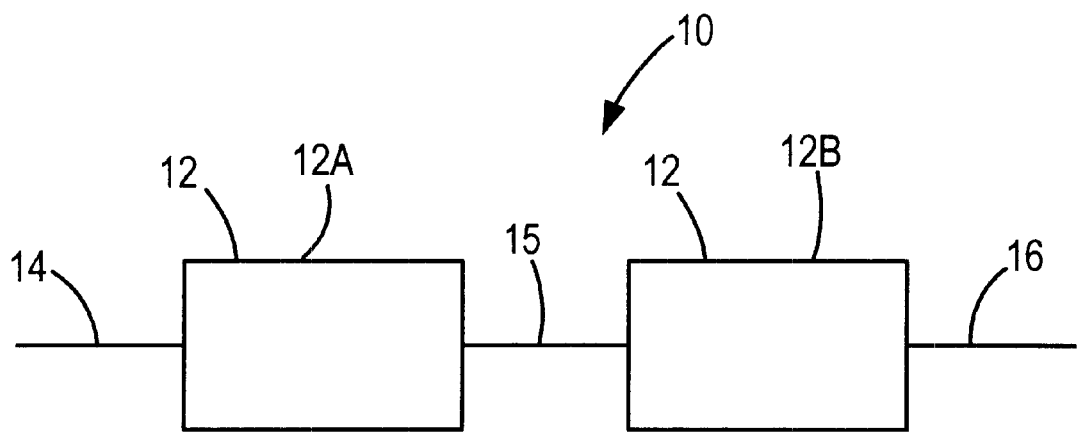
FIG. 1A illustrates an optical filter system having a first optical filter component in optical communication with a second optical filter component.

FIG. 1A illustrates an optical filter system 10 having a plurality of filter components 12. The illustrated optical filter system 10 includes an input waveguide 14, a first filter component 12A, a transition waveguide 15, a second filter component 12B and an output waveguide 16.

During operation of the optical filter system 10, the first filter component 12A receives an input light signal from the input waveguide 14. The input light signal can be a single channel light signal or a multiple channel light signal. The first filter component 12A filters the input light signal and outputs a primary filtered light signal.

The transition waveguide 15 receives the primary filtered light signal from the first filter component 12A. The second filter component 12B receives the primary filtered light signal from the transition waveguide 15. The second filter component 12B filters the primary filtered light signal and outputs a second filtered light signal that serves as the output light signal for the optical filter system 10.

Figure 1B:
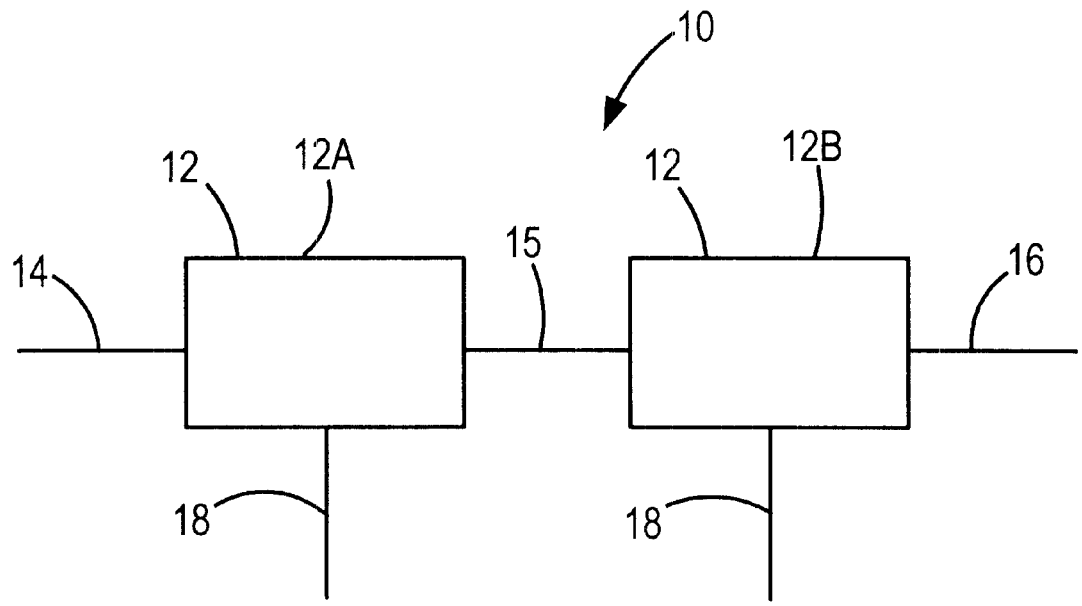
FIG. 1B illustrates another embodiment of an optical filter system.

As shown in FIG. 1B, the optical filter system 10 can include secondary output waveguides 18. The secondary output waveguides 18 can carry the light signals that are filtered out of the output of the optical filter system 10.

Figure 2A:
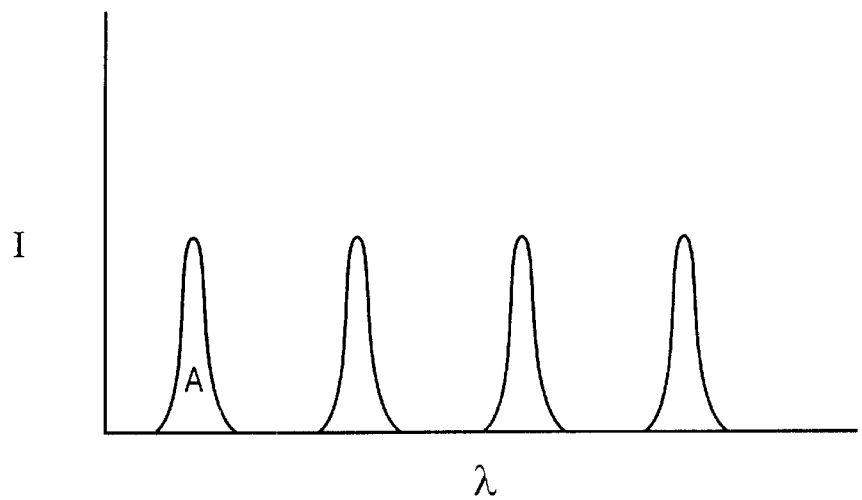
FIG. 2A illustrates the output profile of a filter component.
Figure 2B:
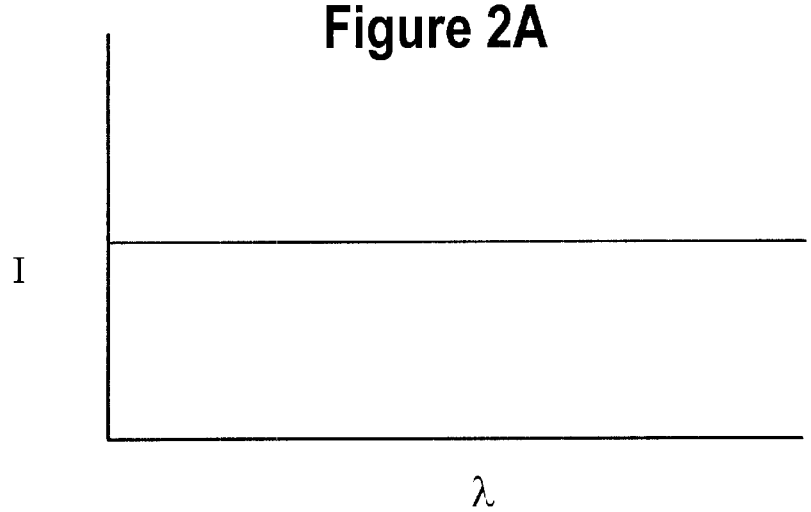
FIG. 2B illustrates the intensity versus wavelength profile of a light signal received by the filter component represented in FIG. 2A.

The first filter component 12A or the second filter component 12B can be a periodic filter 22. In some instances, the first filter component 12A and the second filter component 12B are periodic filters 22. A periodic filter 22 can output a plurality of wavelength bands separated by a constant band period. In some instances, the band period is known as the free spectral range. For instance, FIG. 2A illustrates the output profile of a periodic filter 22 for a range of wavelengths. The output profile of a filter 22 illustrates the relative intensities of the wavelengths that can be output by a filter 22. More specifically, the output profile of a filter 22 is the intensity versus wavelength profile that the filter 22 would produce if the filter 22 received an input light signal having a range of wavelengths at the same intensity. For instance, FIG. 2B illustrates the intensity versus wavelength profile of an input light signal having the same range of wavelengths as the range of wavelengths shown in FIG. 2A. The intensity of each wavelength is a constant. When the filter 22 receives the light signal of FIG. 2B as input, the filter 22 produces a light signal having the intensity versus wavelength profile of FIG. 2A.

The output profile shown in FIG. 2A has a plurality of periodically spaced wavelength bands. The output of the filter 22 can have wavelengths that fall within the wavelength bands shown in FIG. 2A while filtering out other wavelengths.

Figure 2C:
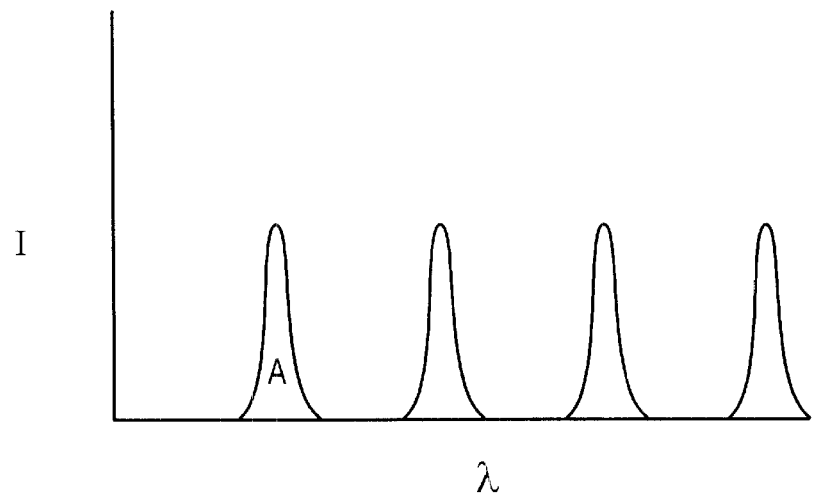
FIG. 2C the output profile of the filter component shown in FIG. 2A after tuning of the filter component.

A periodic filter 22 can be tunable. When a periodic filter 22 is tuned, the wavelength bands shift. For instance, FIG. 2C illustrates the output profile of the filter 22 associated with FIG. 2A after the filter 22 has been tuned. The filter 22 has been tuned such that the wavelength bands shifts toward longer wavelengths. As a result, the band labeled A is shown further to the right in FIG. 2C than in FIG. 2B. The other wavelength bands also shift such that the band period is preserved. Although the filter component 12 is shown as being tuned so the bands shift toward longer wavelengths, the filter components 12 can also be tuned so the bands shift toward shorter wavelengths.

Figure 3A:
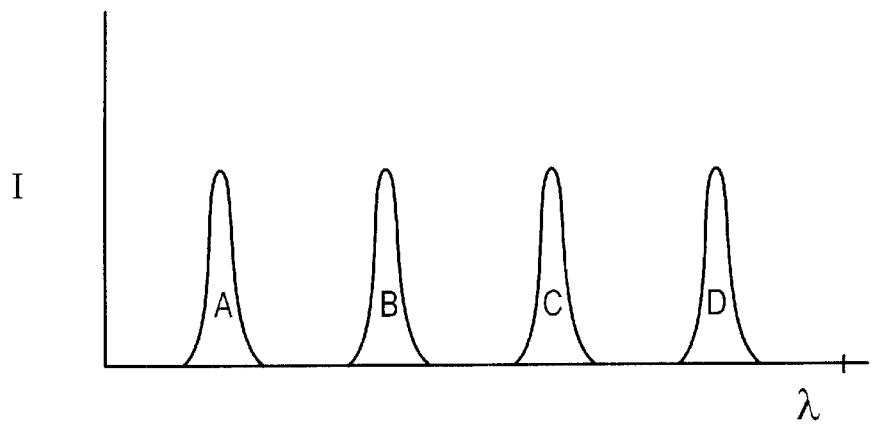
FIG. 3A illustrates the output profile of a first filter component.
Figure 3B:
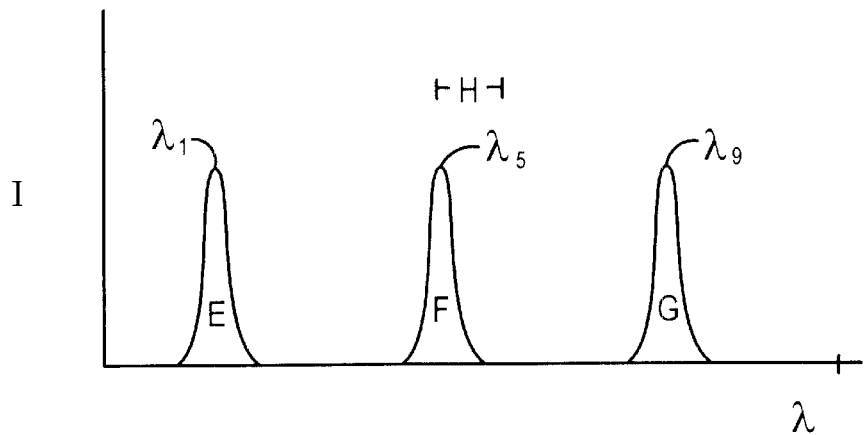
FIG. 3B illustrates the output profile of a second filter component.

The band period associated with the first filter component 12A is different than the band period associated with the second filter component 12B. For instance, FIG. 3A illustrates the output profile for a first filter component 12A and FIG. 3B illustrates the output profile for a second filter component 12B. The first filter component 12A has a smaller band period than the second filter component 12B.

Figure 3C:
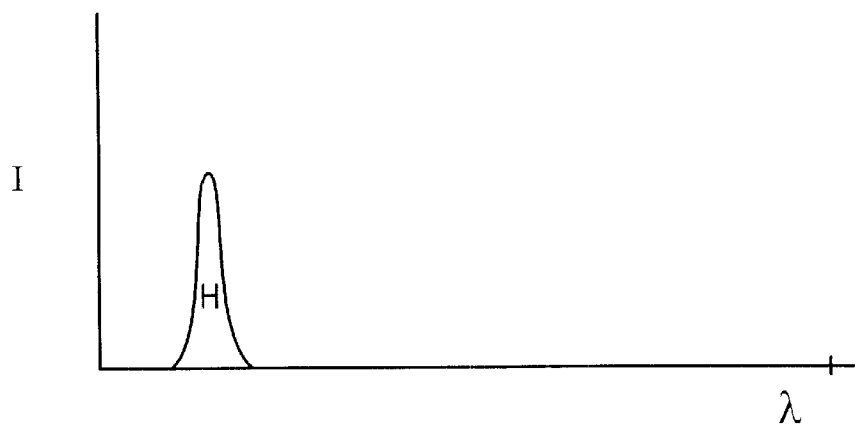
FIG. 3C illustrates the output profile of an optical filter system having the first filter represented in FIG. 3A and the second filter represented in FIG. 3B.

In the optical filter system 10 of FIG. 1A, the second filter component 12B filters the output of the first filter component 12A. As a result, an output light signal produced by the optical filter system 10 can include only the wavelengths that can be output by both the first filter component 12A and the second filter component 12B. Hence, the profile of the optical filter system is generated from the overlap of the first filter component 12A and the second filter component 12B. FIG. 3C illustrates the output profile for an optical filter system including a first filter component 12A with the output profile of FIG. 3A and a second filter component 12B with the output profile of FIG. 3B. The band labeled A in FIG. 3A and the band labeled E in FIG. 3B overlap while no other bands substantially overlap. As a result, the output profile shown in FIG. 3C shows only the band labeled H where the band labeled A and the band labeled E overlap.

When overlap occurs at more than one band, the optical filter system 10 can output light signals having wavelengths in more than one band. Accordingly, when it is desired that the optical filter system 10 produce output light signals having wavelengths in a single band, the band period of the first filter component 12A and the second filter component 12B are selected such that the band overlap can be achieved for only one band in the desired tuning range of the optical filter system 10.

The first filter component 12A and/or the second filter component 12B can be tunable to provide a tunable optical filter system 10. For instance, a tunable optical filter system 10 can be achieved when the second filter component 12B is fixed and the first filter component 12A is tunable. FIG. 3A can be the output profile of a tunable first filter component 12A and FIG. 3B can be the output profile of the fixed second filter component 12B. The first filter component 12A is shown as having a smaller band period than the second filter component, however, the first filter component 12A can have a larger band period than the second filter component The fixed second filter component 12B can be configured to have an output profile with a band period equal to N times the channel separation and bands that are coincident with the channels in the light signals to be output by the optical filter system 10. N is an integer equal to one or greater. As an example, FIG. 3B illustrates an output profile with a band period equal to four times the channel separation, i.e. N=4. Additionally, the bands coincide with the channels to be output by the optical filter system 10. These channels are labeled $\lambda_1, \lambda_5, \lambda_9$. Configuring a filter component 12 to have output profiles with bands that coincide with the desired channels can be done because the channels processed by optical networks often have a constant channel spacing. Further, configuring the fixed filter component 12 to have an output profile with bands that coincide with the channels to be output by the optical filter system 10 allows the optical filter system 10 to output the desired channels.

Figure 4A:
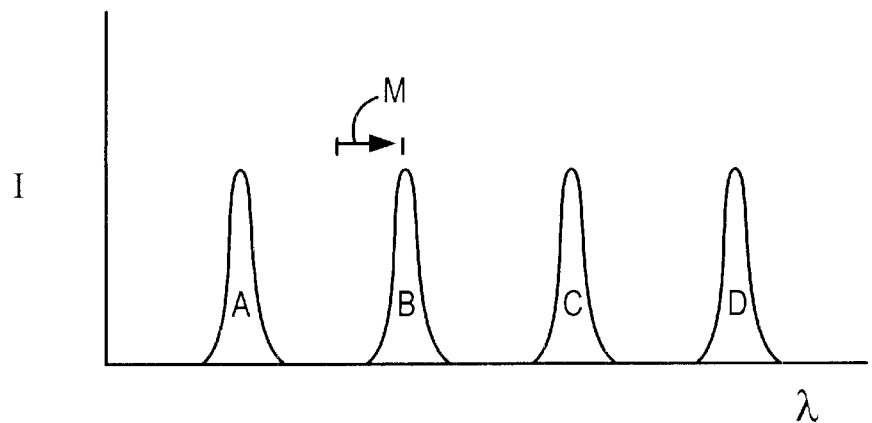
FIG. 4A illustrates the output profile of the first filter component represented in FIG. 3A after tuning.
Figure 4B:
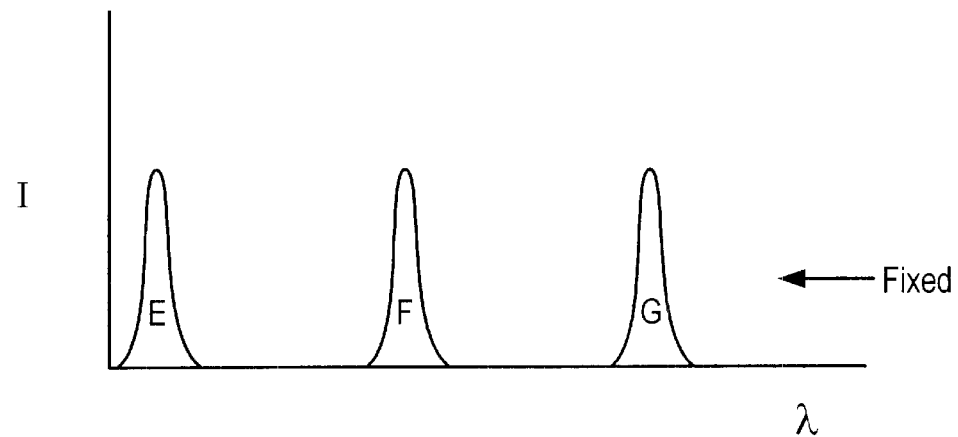
FIG. 4B illustrates the output profile of FIG. 3B.
Figure 4C:
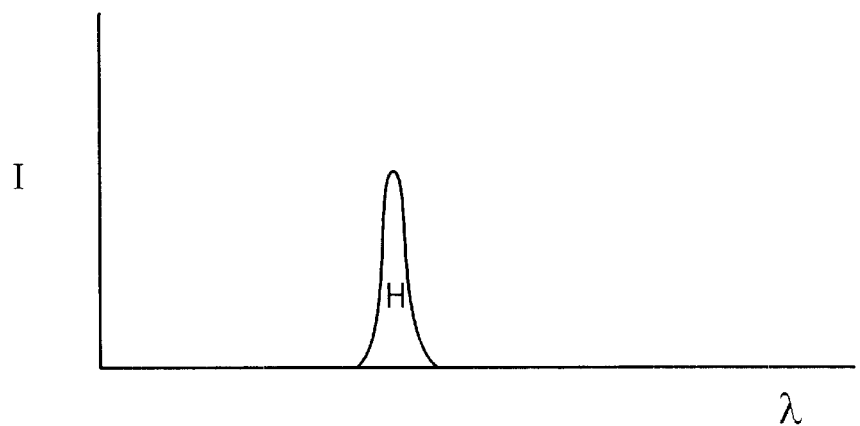
FIG. 4C illustrates the output profile of an optical filter system having the first filter represented in FIG. 4A and the second filter represented in FIG. 4B.

The optical filter system 10 can be tuned to produce an output light signal having the wavelengths in the band labeled F in FIG. 3B. For instance, FIG. 4A through FIG. 4C illustrates the optical component 40 system of FIG. 3A through FIG. 3C tuned to produce an output light signal having wavelengths in the band labeled F. FIG. 4A illustrates the output profile of the first filter component 12A. FIG. 4B illustrates the output profile of the second filter component 12B. FIG. 4C illustrates the output profile of the optical filter system 10.

Because the second filter component 12B is fixed, FIG. 4B is the same as FIG. 3B. FIG. 4A shows the first filter component 12A tuned so the band labeled B is moved to overlap with the band labeled F. This movement is illustrated by the arrow labeled M in FIG. 4A. Accordingly, the output profile of the filter system 10 shown in FIG. 4C shows a band labeled H at the overlap of band labeled B and the band labeled F. As a result, the optical filter system 10 outputs a light signal having wavelengths in the band labeled H in FIG. 4C.

The optical filter system 10 can be tuned to produce light signals having wavelengths in any of the bands of the fixed filter component 12 by tuning the tunable filter component 12 over a range less than or equal to the band period of the tunable filter component 12. As a result, the optical filter system 10 can have a tuning range that is larger than the tuning range of the tunable component. Further, the tuning range of the tunable component can be narrow. The narrow tuning range is often associated with lower power requirements. Further, the changes in bandwidth associated with the tunable component are small when the tunable component is tuned over a small range. As a result, the optical filter system 10 is associated with little or no change in bandwidth over the entire range of the optical filter system 10.

Although the second filter component 12B is described as being fixed and the first filter component 12A is described as being tunable, the same effects can be achieved with the second filter component 12B being tunable and the first filter component 12A being fixed. However, when the first filter component 12A is fixed, the output profile of the first filter component 12A must have bands that coincide with the channels to be output by the optical filter system 10

The first filter component 12A and the second filter component 12B can have different bandwidths. The filter component 12 with the narrower bandwidth determines the bandwidth for the optical filter system 10. When each of the filter components 12 is tunable, providing one of the filter components 12 with a larger bandwidth than the other filter component 12 reduces the accuracy that is required when tuning the filter components 12 such that the bands overlap. For instance, only the filter component 12 with the narrower bandwidth needs to be precisely tuned to a particular band. The filter component 12 with the broader bandwidth can be tuned so as to overlap the narrower bandwidth but does not need precise tuning. When one of the filter components 12 is not tunable, the tunable filter 22 can have the narrower bandwidth. The bands associated with the fixed filter component 12 can drift due to effects such as temperature changes, however, the increased bandwidth of the fixed filter component 12 allows the fixed filter component 12 to continue producing light signals with the desired wavelengths. Alternatively, the tunable filter 22 can have the broader bandwidth. The increased width allows the tunable filter 22 to be easily tuned to overlap the narrower band of the fixed filter 22 and also reduce the bandwidth narrowing effect.

The first filter component 12A and the second filter component 12B can both be tunable to provide a tunable optical filter system 10. FIG. 3A can be the output profile of a tunable first filter component 12A and FIG. 3B can be the output profile of a second tunable filter component 12. The first filter component 12A is shown as having a smaller band period than the second filter component, however, the first filter component 12A can have a larger band period than the second filter component.

Figure 5A:
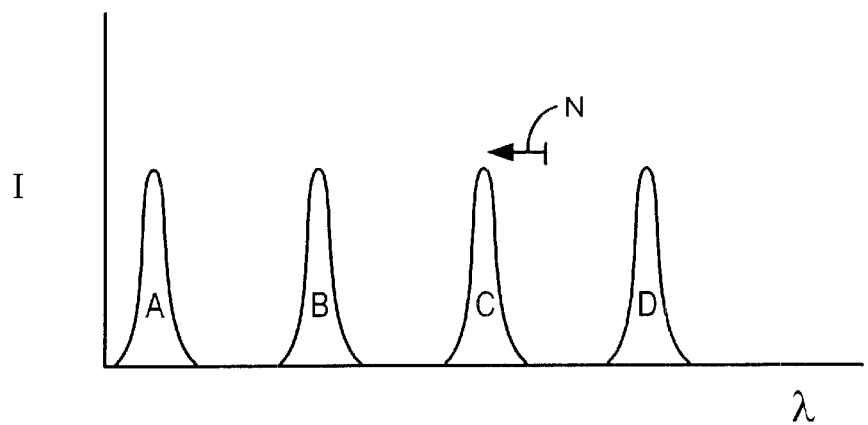
FIG. 5A illustrates the output profile of the first filter component represented in FIG. 3A after tuning.
Figure 5B:
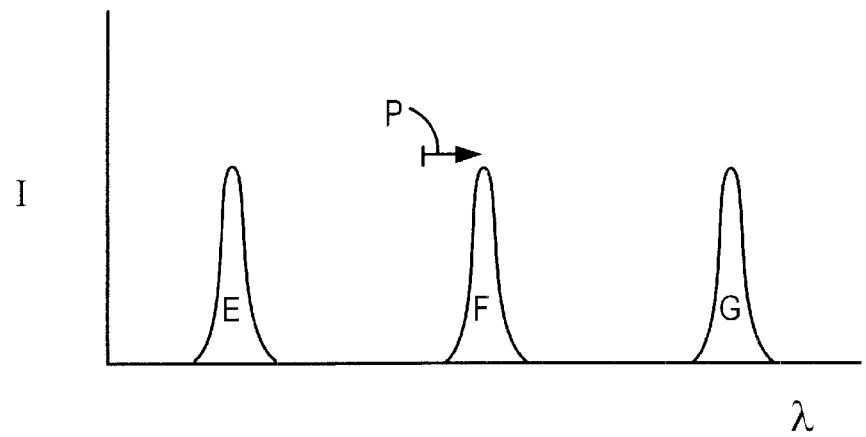
FIG. 5B illustrates the output profile of the second filter component represented in FIG. 3B after tuning.
Figure 5C:
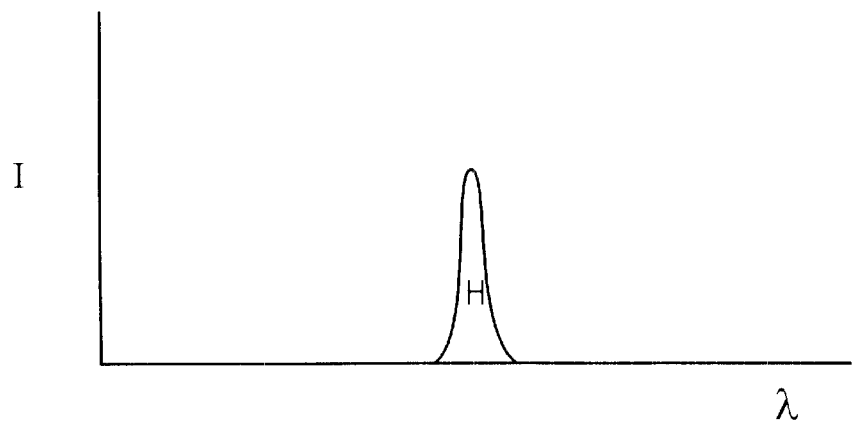
FIG. 5C illustrates the output profile of an optical filter system having the first filter represented in FIG. 5A and the second filter represented in FIG. 5B.

The optical filter system 10 can be tuned to produce an output light signal having the wavelengths in the band labeled H in FIG. 3B. For instance, FIG. 5A through FIG. 5C illustrates the optical component 40 system of FIG. 3A through FIG. 3C tuned to produce an output light signal having wavelengths in the band labeled H. FIG. 5A illustrates the output profile of the first filter component 12A. FIG. 5B illustrates the output profile of the second filter component 12B. FIG. 5C illustrates the output profile of the optical filter system 10.

The first filter component 12A is tuned so the bands labeled C overlaps with the band labeled H as shown by the arrow labeled N. Further, the second filter component 12B is tuned so the band labeled F overlaps with the band labeled H as shown by the arrow labeled P. Accordingly, the output profile of the optical filter system 10 shown in FIG. 5C shows a band at the location of the band labeled H. Because the first filter component 12A and the second filter component 12B have output profiles that overlap at the band labeled H, the optical filter system 10 can output a light signal having wavelengths in the band labeled H.

The optical filter system of FIG. 5A through FIG. 5C can be tuned to any wavelength in the desired range by constructing the first filter component such that the tuning range of the first filter component is at least equal to the band period of the first filter component and by constructing the second filter component such that the tuning range of the second filter component is at least equal to the band period of the second filter component. As a result, the tuning range of a filter components can be as small as the band period of the filter component while providing the optical filter system with a large tuning range. The optical filter system can be constructed such that the tuning range of the optical filter system is wide enough to cover the C or L band.

Figure 6:
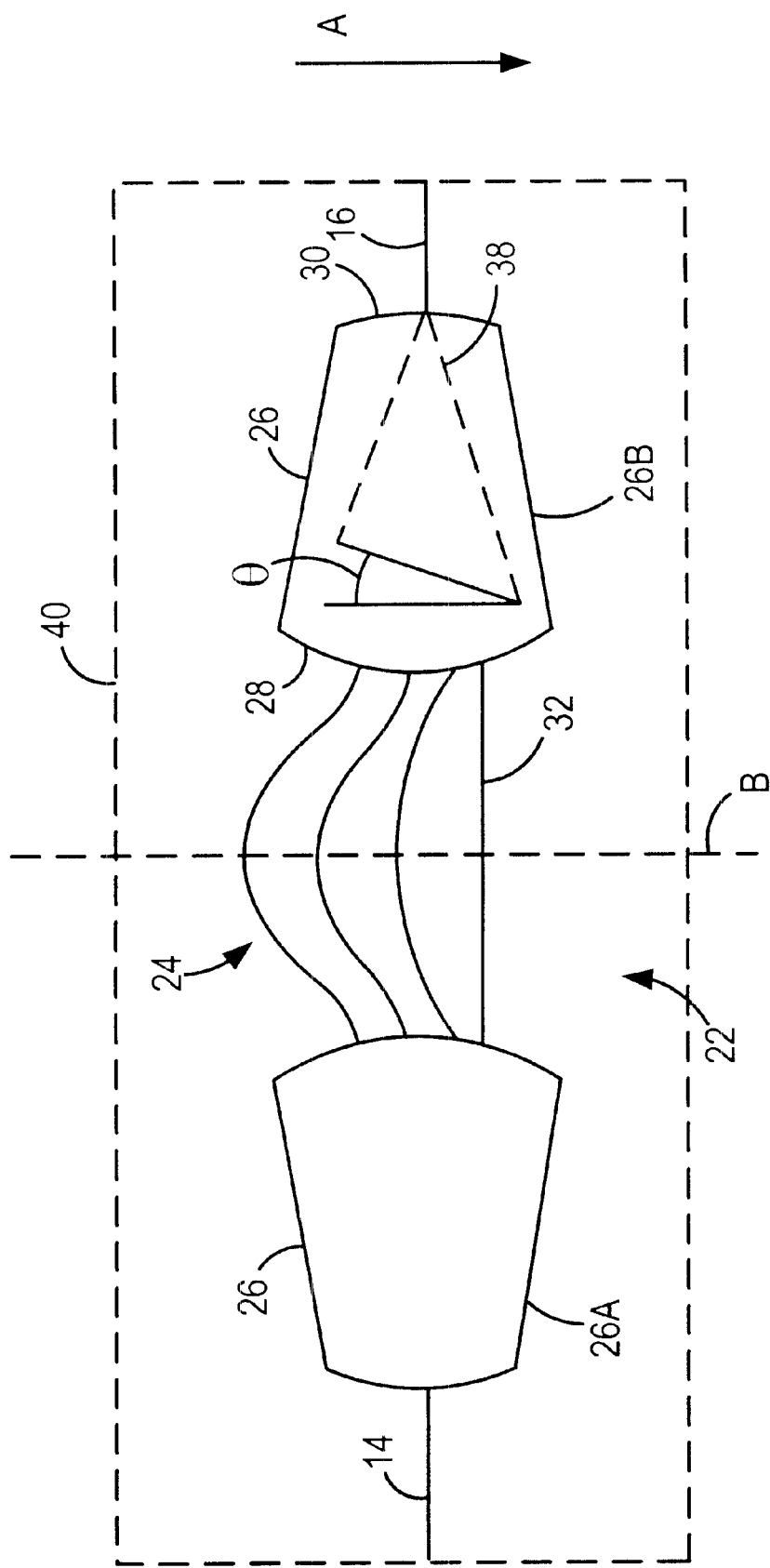
FIG. 6 illustrates a filter that is suitable for use as a first filter component and/or a second filter component.

Suitable filters 22 for use as a first filter component 12A and/or a second filter component 12B include, but are not limited to, Fabry Perot type filters, Mach Zender lattice type filters and multiple Bragg gratings filters. FIG. 6 illustrates another example of a filter 22 that is suitable for use as a first filter component 12A and/or a second filter component 12B. The filter 22 includes an array waveguide grating 24 providing optical communication between light distribution component s 26. At least one input waveguide 14 is in optical communication with a first light distribution component 26A and at least one output waveguide 16 is in optical communication with a second light distribution component 26B. The second light distribution component 26B has an input side 28 and an output side 30. Suitable light distribution components include, but are not limited to, star couplers, Rowland circles, multi-mode interference devices, mode expanders and slab waveguides. Although a single output waveguide 16 is illustrated, the filter 22 can include a plurality of output waveguides 16.

An array waveguide grating 24 connects the first light distribution component 26A and the second light distribution component 26B. The array waveguide grating 24 includes a plurality of array waveguides 32. The array waveguides 32 each have a different effective length. Further, the difference in the effective length of adjacent array waveguides 32, $\Delta L$, is a constant. Because the array waveguides 32 are often curved, the length is not consistent across the width of the array waveguide 32. As a result, the effective length can be the length averaged across the width of the array waveguide 32. Although six array waveguides 32 are illustrated, array waveguide gratings typically include many more than six array waveguides 32 and fewer are possible. Increasing the number of array waveguides 32 can increase the degree of resolution provided by the array.

During operation of the filter 22, a light signal enters the first light distribution component 26A from the input waveguide 14. For the purposes of simplifying the discussion, the light signal is presumed to be a single channel light signal. The first light distribution component 26A distributes the light signal to the array waveguides 32. Each array waveguide 32 receives a fraction of the light signal. Each array waveguide 32 carries the received light signal fraction to the second light distribution component 26B. A light signal fraction traveling through a long array waveguide 32 will take longer to enter the second light distribution component 26B than a light signal fraction light traveling through a shorter array waveguide 32. Unless the effective length differential, ΔL, between adjacent array waveguide 32 is a multiple of the light wavelength, the light signal fraction traveling through a long array waveguide 32 enters the second light distribution component 26B in a different phase than the light signal fraction traveling along the shorter array waveguide 32.

The light signal fraction entering the second light distribution component 26B from each of the array waveguides 32 combines to re-form the light signal. Because the array waveguide 32 causes a phase differential between the light signal fractions entering the second light distribution component 26B from adjacent array waveguides 32, the light signal is diffracted at an angle labeled, θ. The second light distribution component 26B is constructed to converge the light signal at a location on the output side 30 of the second light distribution component 26B. The location where the light signal is incident on the output side 30 of the second light distribution component 26B is a function of the diffraction angle, θ. As illustrated in FIG. 6, the phase differential causes the light signal to be converged at the output waveguide 16. As a result, the light signal appears on the output waveguide 16.

Because ΔL is a different fraction of the wavelength for each channel, the amount of the phase differential is different for different channels. As a result, when the light signal includes a plurality of channels, different channels are diffracted at different angles and are accordingly converged at different locations on the output side 30. Hence, when a multichannel beam enters the second light distribution component 26B, each of the different channels is converged at a different location on the output side 30. Since one of the channels can typically be converged on the output waveguide 16, the output waveguide 16 generally carries only one of the channels at a time.

When ΔL is less than the total wavelength range of the channels to be filtered, the phase differential caused by ΔL will be the same for two or more wavelengths of light. Wavelengths of light with the same phase differential will have the same diffraction angle θ. Each wavelength with the same diffraction angle θ is incident on the same region of the output side 30. As a result, the output waveguide 16 can carry more than one band of light. Additionally, the wavelengths that will have the same phase differential will each be spaced apart by the same wavelength band period. Hence, the filter 22 is periodic because the output waveguide 16 can carry a plurality of bands with a constant band period.

Changing the value of ΔL changes the value of the band period. A smaller ΔL increases the band period while a larger ΔL decreases the band period.

The bandwidth of the filter 22 can be changed by changing the size of the inlet port 38 of the output waveguide 16. A smaller inlet port 38 allows a smaller range of wavelengths to enter the output waveguide 16 and accordingly reduces the bandwidth. A larger inlet port 38 allows a larger range of wavelengths to enter the output waveguide 16 and accordingly increases the bandwidth.

The filter 22 can include an electronic temperature controller (not shown), TEC, for controlling the temperature of the filter 22. A TEC is typically includes a heater and/or cooler for changing the temperature of the filter 22 and electronics for maintaining the filter 22 at a particular temperature. The temperature of the TEC can be adjusted to change the channel that is produced on the output waveguide 16. For instance, increasing the temperature of the filter 22 causes the index of refraction of the array waveguides 32 to increase and accordingly increases the effective length of the array waveguides 32. Increasing the effective length of the array waveguides 32, increases the value of ΔL and causes the channels to shift in the direction of the arrow labeled A in FIG. 6. Hence, increasing the temperature of the filter 22 causes the band(s) produced by the filter 22 to shift toward longer wavelengths. Alternatively, decreasing the temperature of the filter 22 causes the band(s) produced by the filter 22 to shift toward shorter wavelengths.

FIG. 7 illustrates an optical filter system 10 constructed with a filter 22 according to FIG. 6. The optical filter system 10 includes an optical component 40 having a first filter 22 according to FIG. 6 and an optical component 40 having a second filter 22 according to FIG. 6. The first filter 22 serves as the first filter component 12A and the second filter 22 serves as the second filter component 12B. The first filter component 12A is constructed to have a different ΔL that the second filter component 12B in order to provide each of the filter components 12 with a different band period.

The first filter component 12A and the second filter component 12B can be integrated on the same optical component 40 with a transition waveguide 15 serving as the output waveguide 16 of the first filter component 12A and the input waveguide 14 of the second filter component 12B. However, FIG. 7 illustrates an optical fiber 41 connecting the output waveguide 16 of the first filter component 12A with the input waveguide 14 of the second filter component 12B. The optical fiber 41 allows the optical components 40 to be spaced apart from one another. Spacing the optical components 40 apart from one another increases the thermal isolation of the filter components 12 from one another above what could be achieved by integrating the first optical component 40 and the second optical component 40 on the same optical component 40. The increased thermal isolation allows each filter component to be tuned to a different temperature without substantial interference from other filter components. As a result, each of the filter components 12 can be independently tuned.

The tuning range of the filter 22 illustrated in FIG. 6 is generally too narrow to provide effective tuning. However, because the optical filter system 10 can employ filters 22 components with a low tuning range, these filters 22 can be effective with a large tuning range in the context of the optical filter system 10.

FIG. 8A and FIG. 8B illustrate an adaptation of the filter 22 illustrated in FIG. 6. At least a portion of the array waveguides 32 include an effective length tuner 42 as shown in FIG. 8A. Alternatively, the effective length tuners 42 can be integrated into a common effective length tuner 44 configured to change the effective length of a plurality of array waveguides 32 as shown in FIG. 8B. Construction of these tunable filters 22 is taught in U.S. patent application Ser. No. 09/845,685; filed on Apr. 30, 2001; entitled "Tunable Filter" and incorporated herein in its entirety.

Suitable effective length tuners 42 include, but are not limited to, temperature control devices for changing the temperature for all or a portion of an array waveguide 32 and current injection devices for injecting a current or an electrical field through an array waveguide 32. The temperature control devices can be resistive heaters and the current injection devices can be electrical contacts arranged for injecting a current through the array waveguide 32.

The effective length tuners 42 are configured to change the effective length of an array waveguide 32 by changing the effective length of a portion of the array waveguide 32. For instance, increasing the temperature of a portion of an array waveguide 32 causes the index of refraction of the portion of the array waveguide 32 to increase and accordingly increases the effective length of the array waveguide 32. Further, decreasing the temperature of a portion of an array waveguide 32 causes the index of refraction of the portion of the array waveguide 32 to decrease and accordingly decreases the effective length of the array waveguide 32.

The effective length tuners 42 are arranged such that when the effective length tuners 42 are engaged so as to change the effective length of the array waveguides 32, the change to the effective length of each array waveguide 32 is different and that the difference in the amount of change for adjacent array waveguides 32 is a constant. For instance, FIG. 8A is shown as having array waveguides 32 labeled j=1 through N. The effective length tuners 42 can be arranged so the amount of the effective length change to the j th array waveguide 32, $\delta 1_j$, can be expressed (j) $\delta 1_j$, (j−1) $\delta 1_j$, (N−j) $\delta 1_j$ or (N−j+1) $\delta 1_j$. Tuning the effective length tuners 42 such that the difference in the amount of change for adjacent array waveguides 32 is a constant effectively tunes the value of $\Delta L$. Operating the effective length tuners 42 so as to increase $\Delta L$ causes the channels to shift in the direction of the arrow labeled B while operating the effective length tuners 42 so as to decrease $\Delta L$ causes the channels to shift in the direction of the arrow labeled A. As a result, the effective length tuners 42 provide for tunability of the filter 22.

A TEC can be used in conjunction with a filter 22 according to FIG. 8A and FIG. 8B. The TEC is used to maintain the temperature of the filter 22 at some constant value. When the effective length tuners 42 include temperature controllers, the constant temperature can serves as a baseline for the effective length tuners 42. For instance, any heating effects from the effective length tuners 42 can be made relative to the baseline temperature.

Figure 9:
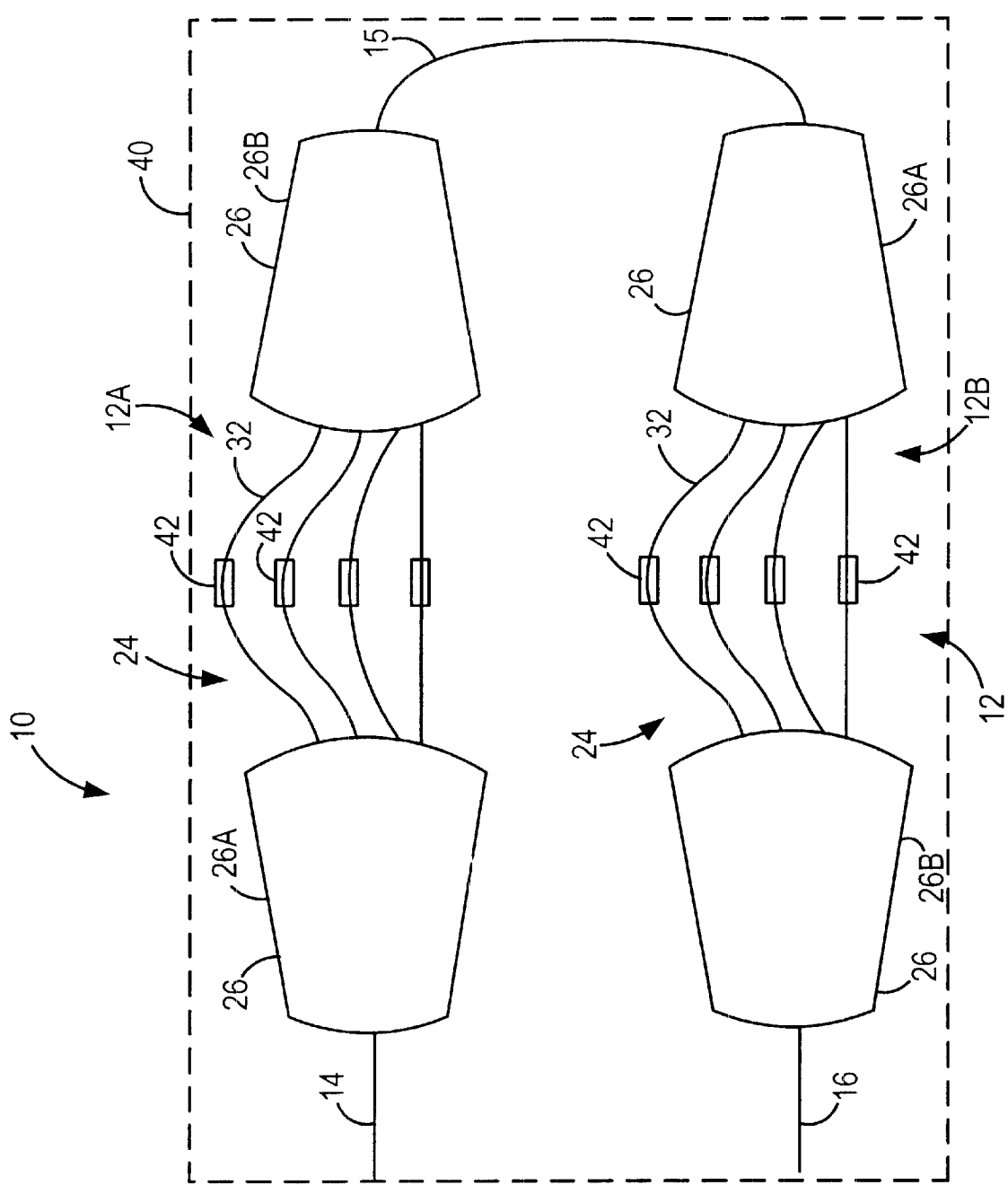
FIG. 9 illustrates an optical filter system constructed using a first filter component and a second filter component constructed according to FIG. 8A.

FIG. 9 illustrates an embodiment of an optical filter system 10 employing a filter 22 according to FIG. 8A and FIG. 8B. The optical filter system 10 includes a first filter 22 serving as the first filter component 12A and a second filter 22 serving as a second filter component 12B. The first filter component 12A is constructed to have a different $\Delta L$ that the second filter component 12B in order to provide each of the filter components 12 with a different band period. The first filter component 12A and the second filter component 12B are integrated on the same optical component 40 with a transition waveguide 15 serving as the output waveguide 16 of the first filter component 12A and the input waveguide 14 of the second filter component 12B. Each of the filters 22 is associated with different effective length tuners 42. Because the effective length tuners 42 have localized effects, the effects from effective length tuners 42 associated with one filter 22 do not affect other effective length tuners 42 on the same optical component 40.

Figure 10:
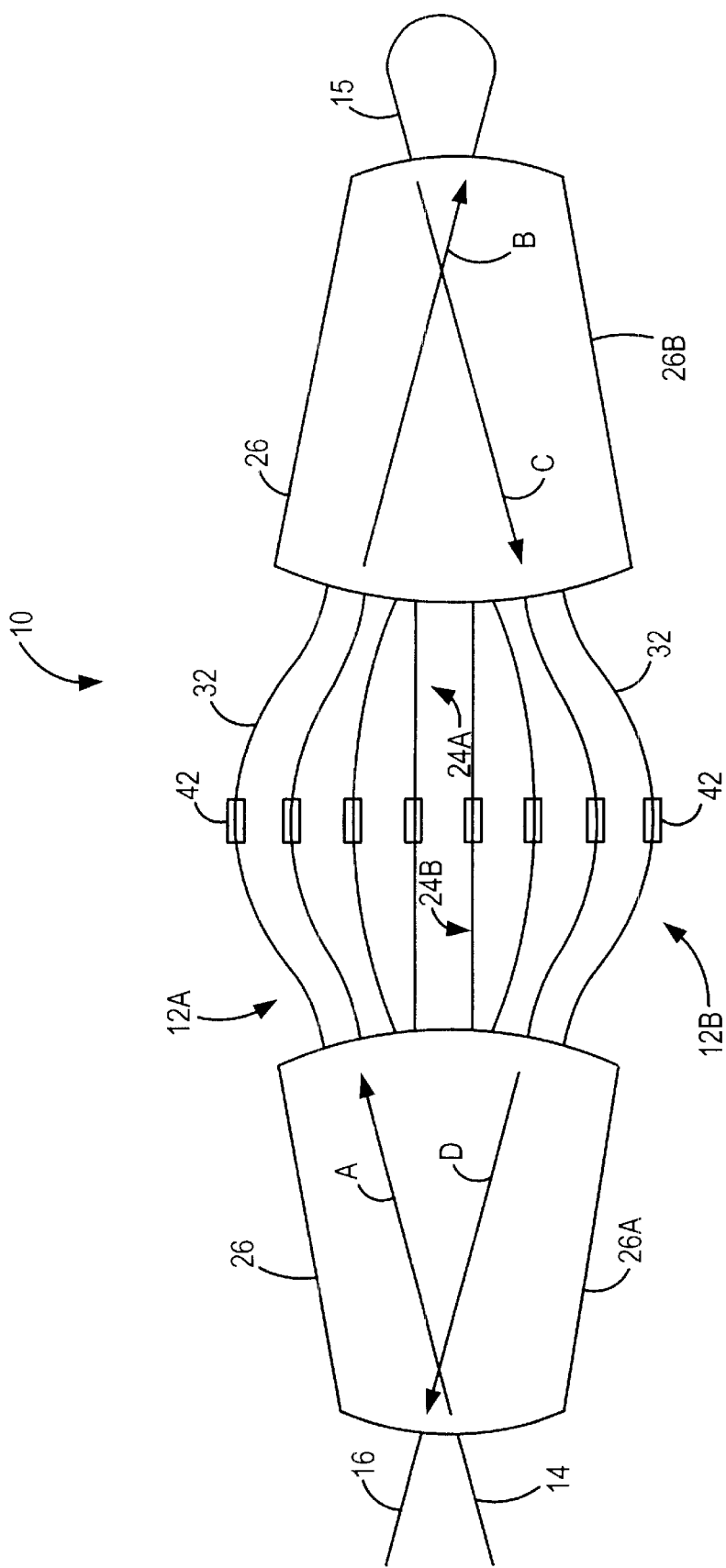
FIG. 10 illustrates an optical filter system constructed using the principles of the filter illustrated in FIG. 8A.

FIG. 10 illustrates an embodiment of an optical filter system 10 employing a filter 22 according to FIG. 8A and FIG. 8B. An input waveguide 14 and an output waveguide 16 are in optical communication with the first light distribution component 26A. A first array waveguide grating 24A and a second array waveguide grating 24B are positioned between a first light distribution component 26A and a second light distribution component 26B. The first array waveguide grating 24A is constructed with a different $\Delta L$ than the second filter component 12B in order to provide the first filter component 12A and the second filter component 12B with different band period. A transition waveguide 15 connects one region of the output side 30 with another region of the output side 30.

The first filter component 12A and the second filter component 12B use the same first light distribution component 26A and second light distribution component 26B. As a result, the size of the optical component 40 system is reduced.

During operation of the optical filter system 10, a light signal from the input waveguide 14 travels through the first light distribution component 26A to the first array waveguide grating 24A as illustrated by the arrow labeled A. The light signal from the first array waveguide grating 24A travels through the second light distribution component 26B to an input port of the transition waveguide 15 as illustrated by the arrow labeled B. The first array waveguide grating 24A and the second light distribution component 26B serve as the first filter component 12A. Accordingly, the light signal traveling through the transition waveguide 15 is the primary filtered light signal.

The primary filtered light signal enters the second light distribution component 26B through an output port of the transition waveguide 15. The primary filtered light signal travels from the output port to the second array waveguide grating 24B as illustrated by the arrow labeled C. The primary filtered light signal travels from the second array waveguide grating 24B through the first light distribution component 26A to the output waveguide 16 as illustrated by the arrow labeled D. The second array waveguide grating 24B and the first light distribution component 26A serve as the second filter component 12B. As a result, the first light distribution component 26A and the second array waveguide grating 24B filter the primary filtered signal to produce the output light signal.

The first array waveguide grating 24A is associated with different effective length tuners 42 than the second array waveguide grating 24B. Because the first array waveguide grating 24A and the second light distribution component 26B serve as the first filter component 12A, the first filter component 12A is tuned by tuning the effective length tuners 42 associated with the first array waveguide 32. Because the second array waveguide grating 24B and the first light distribution component 26A serve as the second filter component 12B, the second filter component 12B is tuned by tuning the effective length tuners 42 associated with the second array waveguide grating 24B. As a result, the first filter component 12A and the second filter component 12B can be independently tuned.

As noted above, the localized characteristics of the effective length tuners 42 reduce interaction between the effective length tuners 42 associated with different array waveguide gratings 24.

Figure 11A:
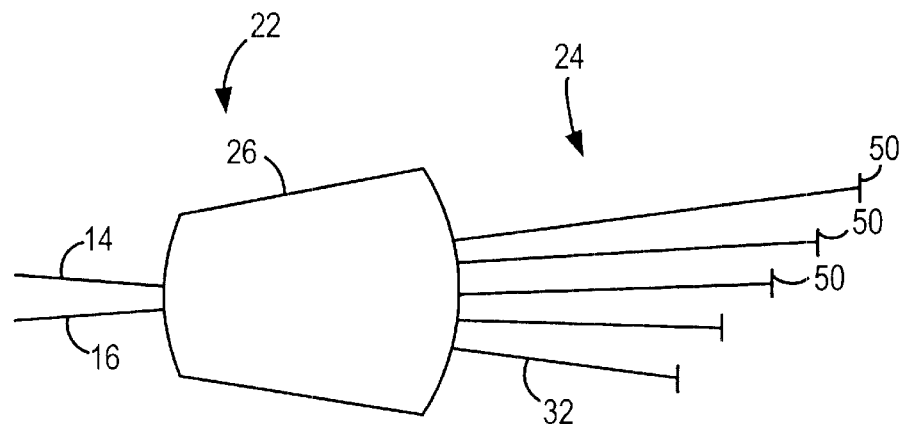
FIG. 11A illustrates a filter that is suitable for use as a first filter component and/or a second filter component. The filter includes an array waveguide grating having a plurality of array waveguides. A reflector is positioned at an end of each array waveguide.

Each of the filters 22 illustrated above can be constructed with a single light distribution component 26 by positioning reflectors 50 along the array waveguides 32 as shown in FIG. 11A. The filter 22 includes an input waveguide 14 and an output waveguide 16 that are each connected to the same side of the light distribution component 26. The array waveguides 32 include a reflector 50 configured to reflect light signals. The use of reflectors 50 can eliminate the need for a second light distribution component 26B and can accordingly reduce the size of the filter 22 as well as the size of the optical filter system 10.

During operation of the filter 22, a light signal from the input waveguide 14 is distributed to the array waveguides 32. The array waveguides 32 carry the light signal portions to the reflector 50 where they are reflected back toward the light distribution component 26. The light distribution component 26 combines the light signal portions and converges the light signal at the output waveguide 16. As a result, the output waveguide 16 carries the light signal.

Figure 11B:
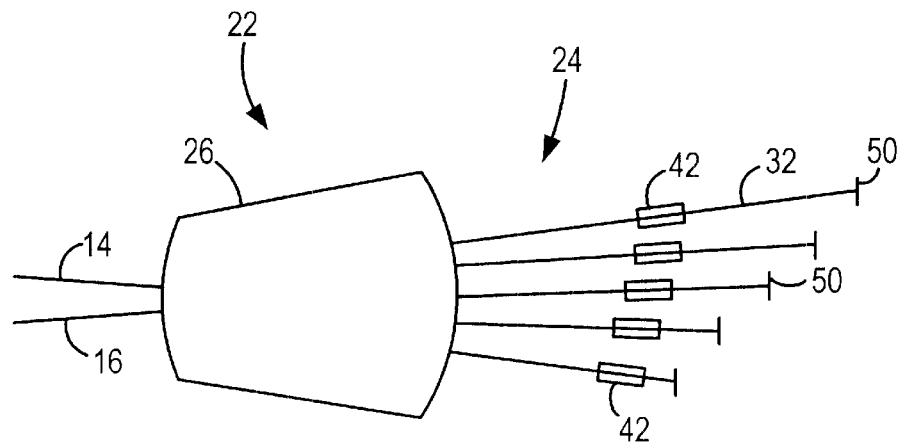
FIG. 11B illustrates a filter that is suitable for use as a first filter component and/or a second filter component. The filter includes an array waveguide grating having a plurality of array waveguides. A reflector is positioned at an end of each array waveguide. At least a portion of the array waveguides include an effective length tuner for changing the effective length of an array waveguide.

A TEC can be used to tune the output of a filter 22 according to FIG. 11A. Alternatively or additionally, one or more of the array waveguides 32 can include an effective length tuner 42 as shown in FIG. 11B. The effective length tuners 42 can be operated so as to tune the output of the filter 22.

Figure 11C:
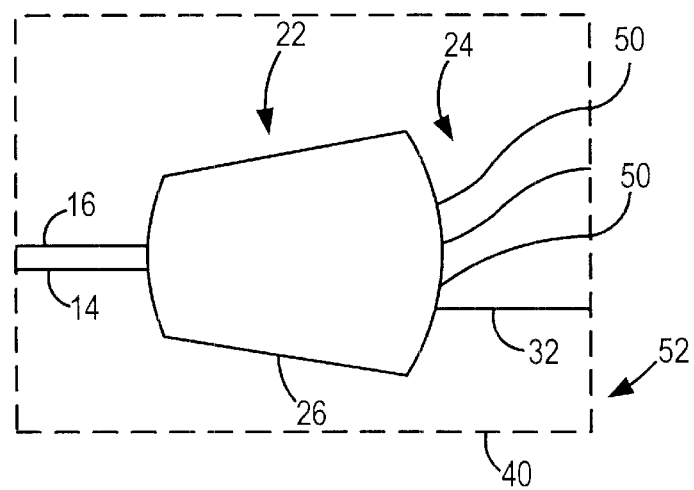
FIG. 11C illustrates an optical component having a filter that is suitable for use as a first filter component and/or a second filter component. The filter includes an array waveguide grating having a plurality of array waveguides. An edge of the optical component serves as a reflector positioned at an end of each array waveguide.

The reflectors 50 can be formed by an edge 52 of the optical component 40 as shown in FIG. 11C. The edge 52 of the optical component 40 can include a reflective coating in order to increase reflection of the light signals at the edge 52 of the optical component 40. When the reflectors 50 are to be formed by the edge 52 of an optical component 40, a filter 22 such as the filter 22 of FIG. 6 or FIG. 8A can be fabricated with an input waveguide 14 and an output waveguide 16 in optical communication with the light distribution component 26 as well as an input waveguide 14 and an output waveguide 16 in optical communication with the second light distribution component 26B. The filter 22 can then be cleaved along a line such as the dashed line labeled B in FIG. 6. A reflective coating can be formed on all or a portion of the edge 52 formed by cleaving. An input waveguide 14 in one of the filters 22 will serve as an output waveguide 16 and an output waveguide 16 in one of the filters will serve as an input waveguide 14.

Figure 12:
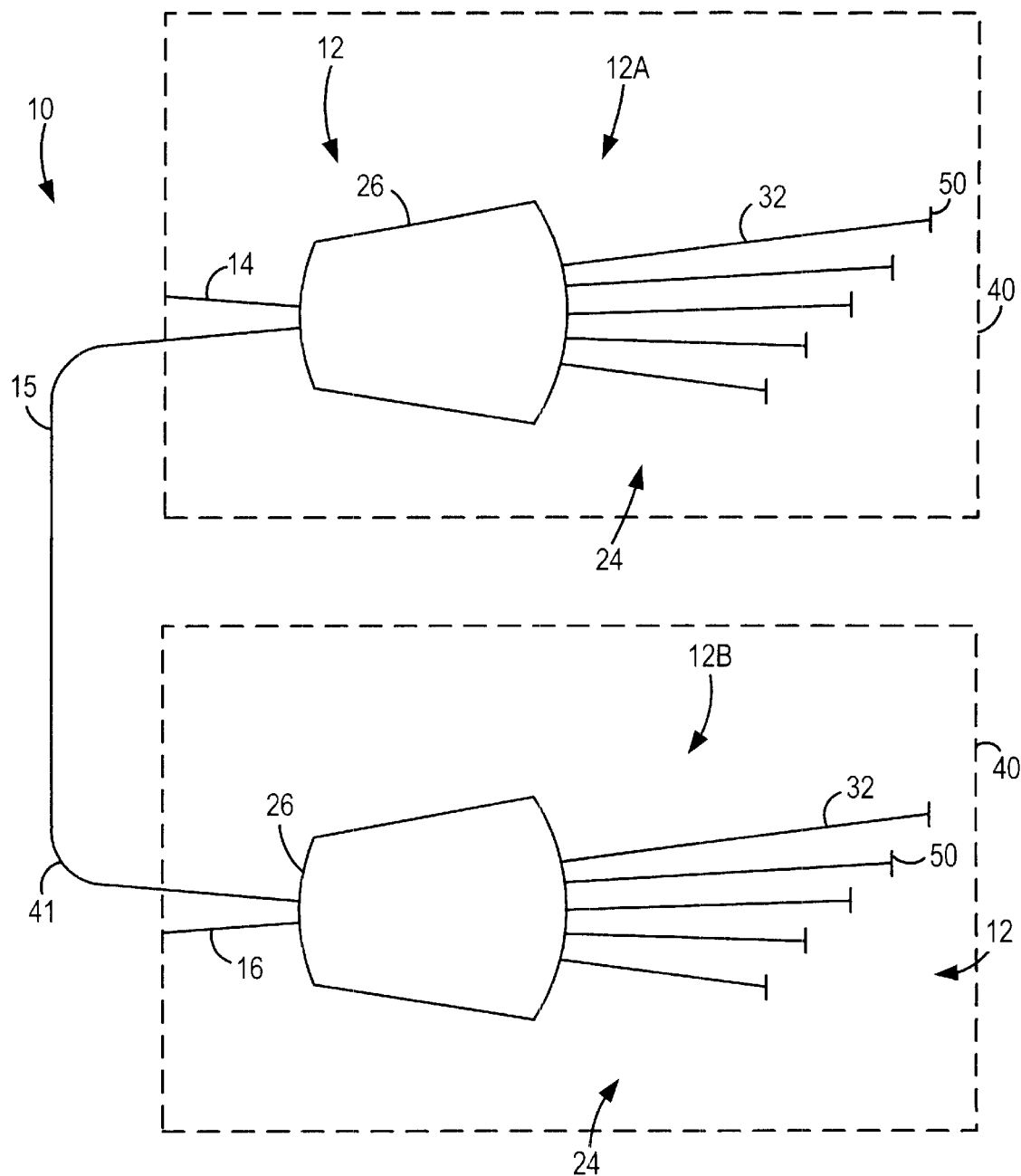
FIG. 12 illustrates an optical filter system constructed with a filter according to FIG. 11A.

FIG. 12 illustrates an optical filter system 10 constructed with a filter 22 according to FIG. 11A. The optical filter system 10 includes a first optical component 40 having a first filter 22 according to FIG. 11A and a second optical component 40 having a second filter 22 according to FIG. 11A. The first filter 22 serves as the first filter component 12A and the second filter 22 serves as the second filter component 12B. The first filter component 12A is constructed to have a different ΔL that the second filter component 12B in order to provide each of the filter components 12 with a different band period.

An optical fiber 41 connects the output waveguide 16 of the first filter component 12A with the input waveguide 14 of the second filter component 12B. The optical fiber 41 allows the optical components 40 to be spaced apart from one another. Spacing the optical components 40 apart from one another increases the thermal isolation of the filter components 12 from one another above what could be achieved by integrating the first filter component 12A and the second filter component 12B on the same optical component 40. The increased thermal isolation allows each filter component to be tuned to a different temperature without substantial interference from other filter components. As a result, each of the filter components 12 can be independently tuned.

Figure 13:
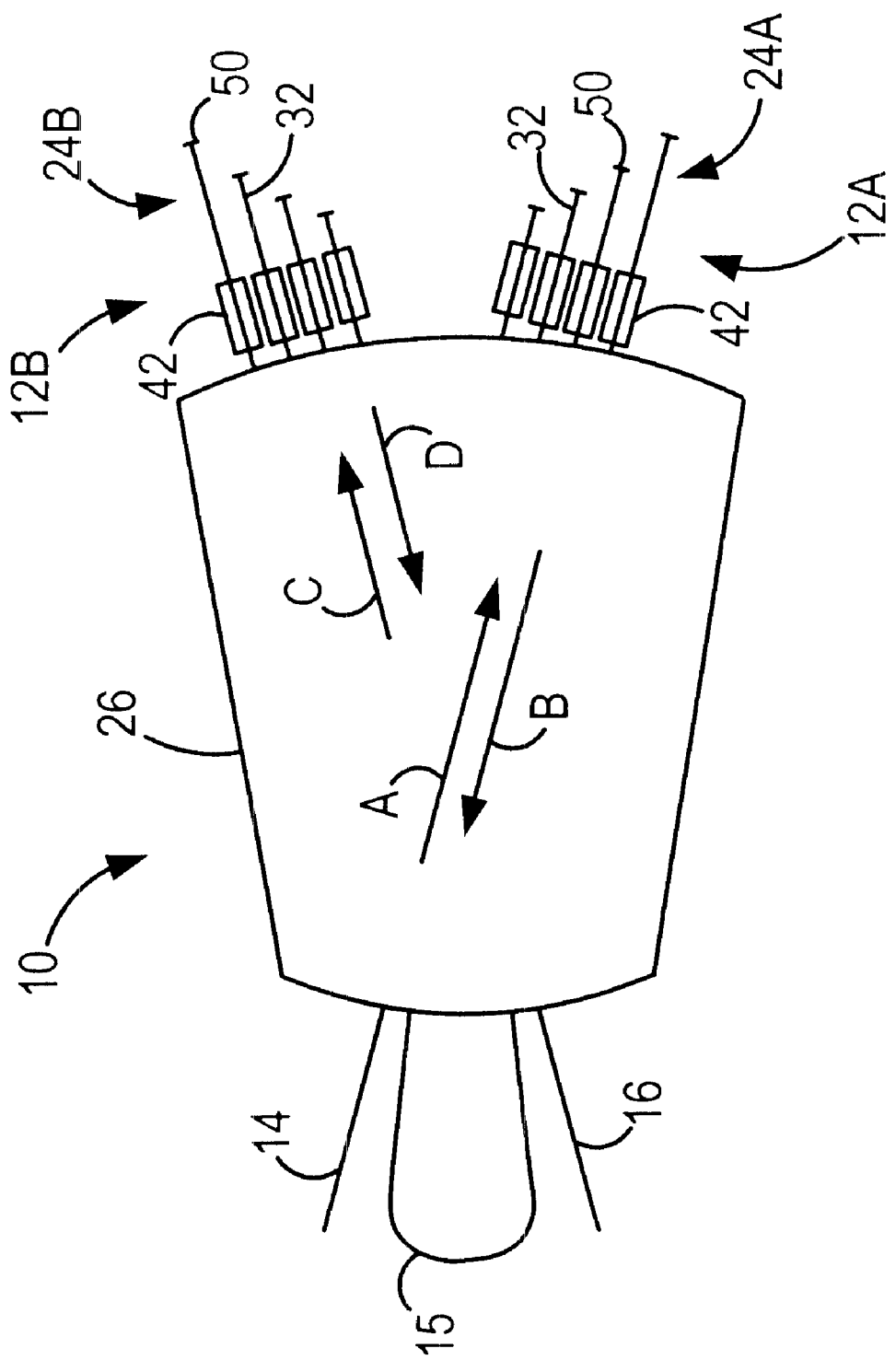
FIG. 13 illustrates an optical filter system constructed using the principles of the filter illustrated in FIG. 11B.

FIG. 13 illustrates an embodiment of an optical filter system 10 employing a filter 22 according to FIG. 11B. An input waveguide 14 and an output waveguide 16 are in optical communication with the light distribution component 26. A transition waveguide 15 connects one region of the light distribution component 26 with another region of the light distribution component 26. A first array waveguide grating 24A and a second array waveguide grating 24B are in optical communication with the light distribution component 26. The first array waveguide grating 24A is constructed with a different ΔL than the second filter component 12B in order to provide the first filter component 12A and the second filter component 12B with different band period. The optical filter system 10 employs a single light distribution component 26 and accordingly has a reduced size.

During operation of the optical filter system 10, a light signal from the input waveguide 14 travels through the light distribution component 26 to the first array waveguide grating 24A as illustrated by the arrow labeled A. A portion of the light signal travels along each array waveguide 32 and is reflected by the reflectors 50 back toward the light distribution component 26. The light from the light distribution component 26 and from the first array waveguide grating 24A travels through the light distribution component 26 to an input port of the transition waveguide 15 as illustrated by the arrow labeled B. The light distribution component 26 and the first array waveguide grating 24A serve as the first filter component 12A. Accordingly, the light signal traveling through the transition waveguide 15 is the primary filtered light signal.

The primary filtered light signal enters the light distribution component 26 through an output port of the transition waveguide 15. The primary filtered light signal travels from the output port to the second array waveguide grating 24B as illustrated by the arrow labeled C. The primary filtered light signal travels from the second array waveguide grating 24B through the light distribution component 26 to the output waveguide 16 as illustrated by the arrow labeled D. The light distribution component 26 and the second array waveguide grating 24B serve as the second filter component 12B. As a result, the light distribution component 26 and the second array waveguide grating 24B filter 22 the primary filtered signal to produce a secondary filtered light signal that serves as the output light signal.

The first array waveguide grating 24A is associated with different effective length tuners 42 than the second array waveguide grating 24B. Because the light distribution component 26 and the first array waveguide grating 24A serve as the first filter component 12A, the first filter component 12A is tuned by tuning the effective length tuners 42 associated with the first array waveguide 32. Because the light distribution component 26 and the second array waveguide grating 24B serve as the second filter component 12B, the second filter component 12B is tuned by tuning the effective length tuners 42 associated with the second array waveguide grating 24B. As a result, the first filter component 12A and the second filter component 12B can be independently tuned.

As noted above, the localized characteristics of the effective length tuners 42 reduce interaction between the effective length tuners 42 associated with different array waveguide gratings 24.

As noted above, one of the filter components 12 can be fixed. As a result, the first filter component 12A and the second filter component 12B need not each include a TEC in the optical filter systems 10 of FIG. 7 and FIG. 12. Additionally, the first array waveguide grating 24A and the second array waveguide grating 24B need not each include effective length tuners 42 in the optical filter systems 10 of FIG. 9, FIG. 10 and FIG. 13. Further, the optical filter system 10 can employ a different type of effective length tuner 42 in the first array waveguide grating 24A than in the second array waveguide grating 24B. For instance, the first array waveguide grating 24A can include different effective length tuners 42 associated with each array waveguide 32 while the second array waveguide grating 24B includes a common effective length tuner 44.

When the first filter component and/or the second filter component are constructed according to FIG. 6 through FIG. 13, the size of the filter components can be reduced by selecting a narrow band period. Reducing the band period allows these filter components to be constructed with smaller light distribution components. As a result, reducing the band period allows the size of the filter components to be reduced.

Figure 14A:
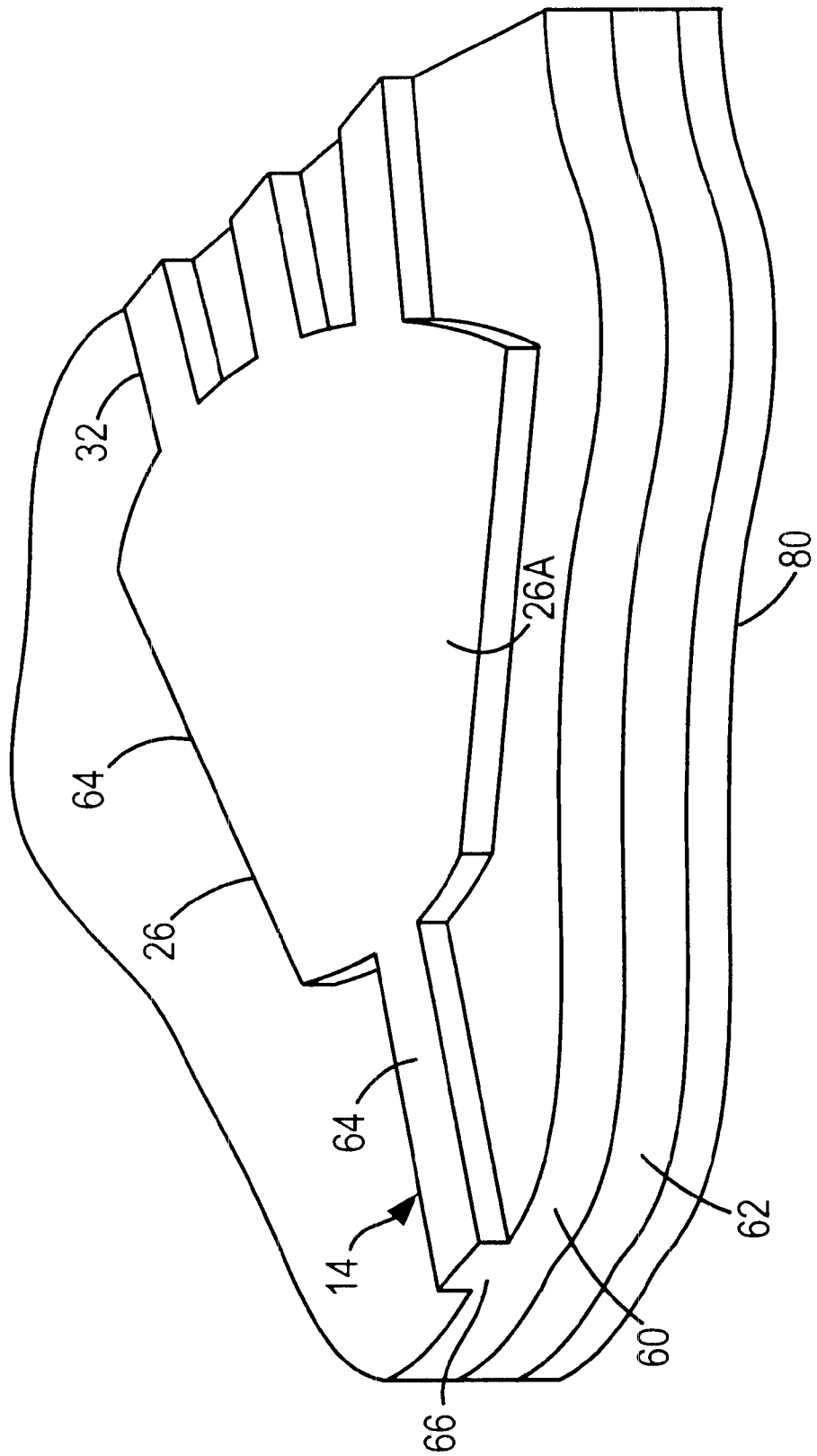
FIG. 14A illustrates a suitable construction of an optical component having a filter.
Figure 14B:
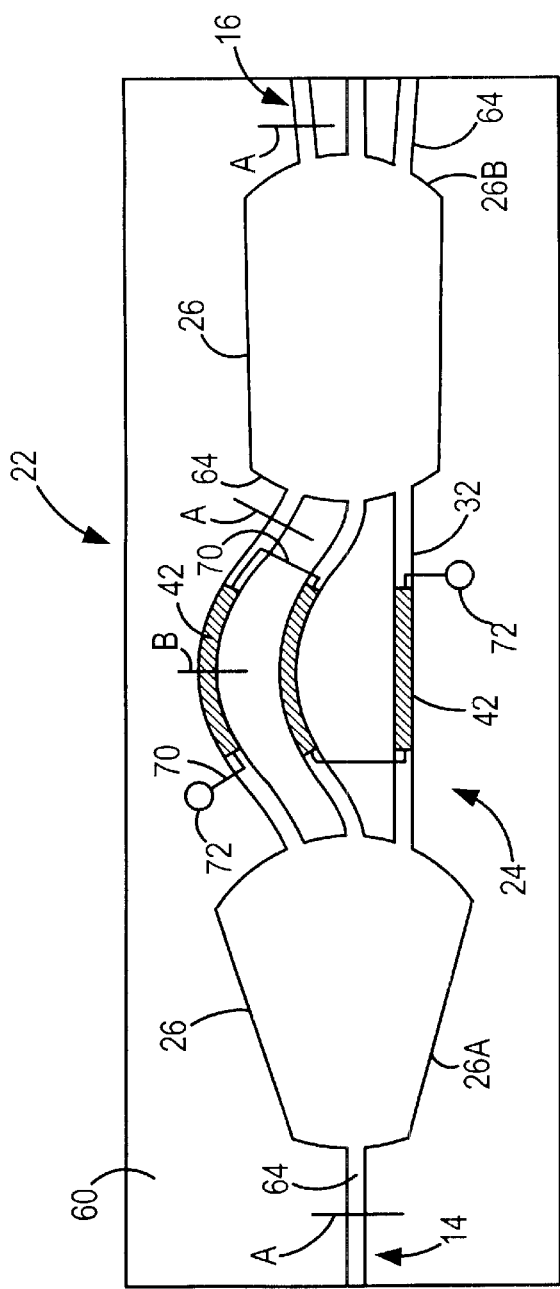
FIG. 14B is a topview of an optical component having a filter.
Figure 14C:
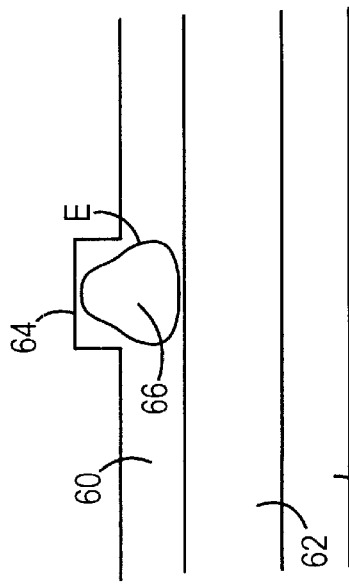
FIG. 14C is a cross section of the optical component shown in FIG. 14B taken at the line labeled A.

FIG. 14A through FIG. 14C illustrate suitable construction for the above filters 22. FIG. 14A illustrates a suitable construction for an optical component 40 having a filter 22. A portion of the filter 22 is shown on the component. The illustrated portion has a first light distribution component 26A, an input waveguide 14 and a plurality of array waveguides 32. FIG. 14B is a topview of an optical component 40 having a filter 22 constructed according to FIG. 14A. FIG. 14C is a cross section of the component in FIG. 14B taken at any of the lines labeled A. Accordingly, the waveguide illustrated in FIG. 14C could be the cross section of an input waveguide 14, an array waveguide 32, a transition waveguide 15, or an output waveguide 16.

For purposes of illustration, the filter 22 is illustrated as having three array waveguides 32 and an output waveguide 16. However, array waveguide gratings 24 for use with a filter 22 can have many more than three array waveguides 32. For instance, array waveguide gratings 24 can have tens to hundreds or more array waveguides 32.

The component includes a light transmitting medium 60 formed over a base 62. The light transmitting medium 60 includes a ridge 64 configured to constrain a light signal to a light signal carrying region 66. The ridge 64 defines a portion of the light signal carrying region 66. Suitable light transmitting media include, but are not limited to, silicon, polymers, silica, SiN, LiNbO$_3$, GaAs and InP. The base 62 reflects light signals from the light signal carrying region 66 back into the light signal carrying region 66. As a result, the base 62 also defines a portion of the light signal carrying region 66. The line labeled E illustrates the profile of a light signal carried in the light signal carrying region 66 of FIG. 14C. The light signal carrying region 66 extends longitudinally through the waveguide and light distribution component s 26.

FIG. 14A illustrated the base 62 positioned over the heater of a TEC, however, the TEC is optional in many embodiments.

Figure 14D:
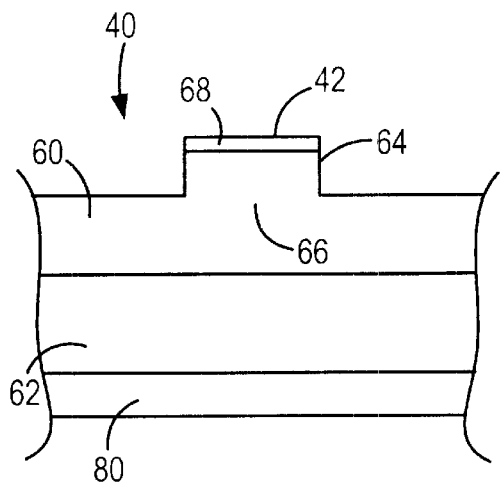
FIG. 14D is a cross section of the optical component shown in FIG. 14B taken at the line labeled B.

The embodiment illustrated in FIG. 14B has an array waveguide grating 24 with effective length tuners 42. FIG. 14D is a cross section of the optical component 40 taken at across an effective length tuner 42 at the line labeled B in FIG. 14B. The effective length tuner 42 includes a layer of metal 68 formed over the light transmitting medium 60. A metal trace 70 connects each of the effective length tuners 42 in series. The electrical trace ends at pads 72. When an electrical potential is applied between the pads 72, the resulting current causes heating of the effective length tuners 42.

As noted above, the effective length tuners 42 provide tuning of the optical filter 22 when they are configured to change the effective length of the array waveguides 32 such that the difference in the amount of change for adjacent array waveguides 32 is a constant. This can be achieved by making the length of each effective length tuner 42 in FIG. 14B different. Additionally, the difference in the length of adjacent effective length tuners 42 is a constant. When the effective length tuners 42 are integrated into a common effective length tuner 44, the common effective length tuner 44 has a geometry that preserves the above length relationships. Because the array waveguides 32 are often curved, the length of an effective length tuner 42 is not necessarily consistent across the width of the array waveguide 32. As a result, the length of an effective length tuner 42 can refer to the length of the effective length tuner 42 averaged across the width of the array waveguide 32.

Although FIG. 14D illustrates the effective length tuner 42 positioned over the ridge 64, the effective length tuner 42 can extend down the sides of the ridge 64. In some instances, the effective length tuners 42 extend over the ridge 64, down the sides of the ridge 64 and away from the sides of the ridge 64 in order to increase the portion of the light signal carrying region 66 that is exposed to the effects of the effective length tuner 42.

Figure 14E:
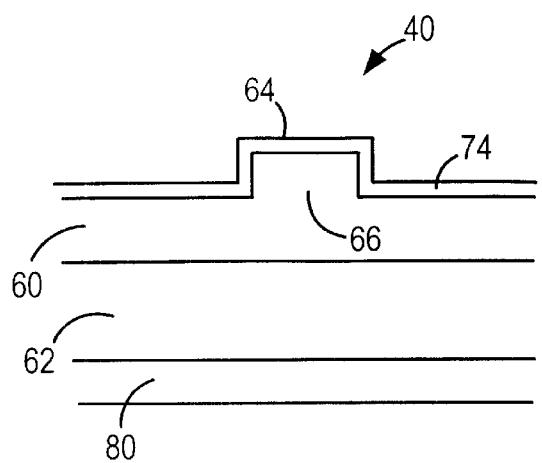
FIG. 14E illustrates another embodiment of the cross section shown in FIG. 14C.

A cladding layer 74 can be optionally be positioned over the light transmitting medium 60 as shown in FIG. 14E. The cladding layer 74 can have an index of refraction less than the index of refraction of the light transmitting medium 60 so light signals from the light transmitting medium 60 are reflected back into the light transmitting medium 60.

A component constructed as shown in FIG. 14A through FIG. 14D can be constructed by obtaining a component having a light transmitting medium 60 positioned over a base 62. The component can be obtained from a supplier or can be fabricated. A mask is formed so the regions of the light transmitting medium 60 where a ridge 64 is to be formed are protected. An etch is then performed so as to form the ridges 64 to the desired height. The masks are removed. Any effective length tuners 42 can then be constructed. For instance, when the effective length tuners 42 include electrical contacts or metal layers, the electrical contacts can be grown or deposited on the optical component 40. When the optical component 40 is to include a TEC, the component can then be bonded to the temperature controller of the TEC using a material such as epoxy.

The array waveguides 32 of FIG. 14B are shown as having a curved shape. A suitable curved waveguide is taught in U.S. patent application Ser. No. 09/756,498, filed on Jan. 8, 2001, entitled "An efficient Curved Waveguide" and incorporated herein in its entirety. Other filter 22 constructions can also be employed. For instance, filters 22 can be constructed with straight waveguides as taught in U.S. patent application Ser. No. 09/724,175, filed on Nov. 28, 2000, entitled "A Compact Integrated Optics Based Array waveguide Demultiplexer" and incorporated herein in its entirety.

Figure 14F:
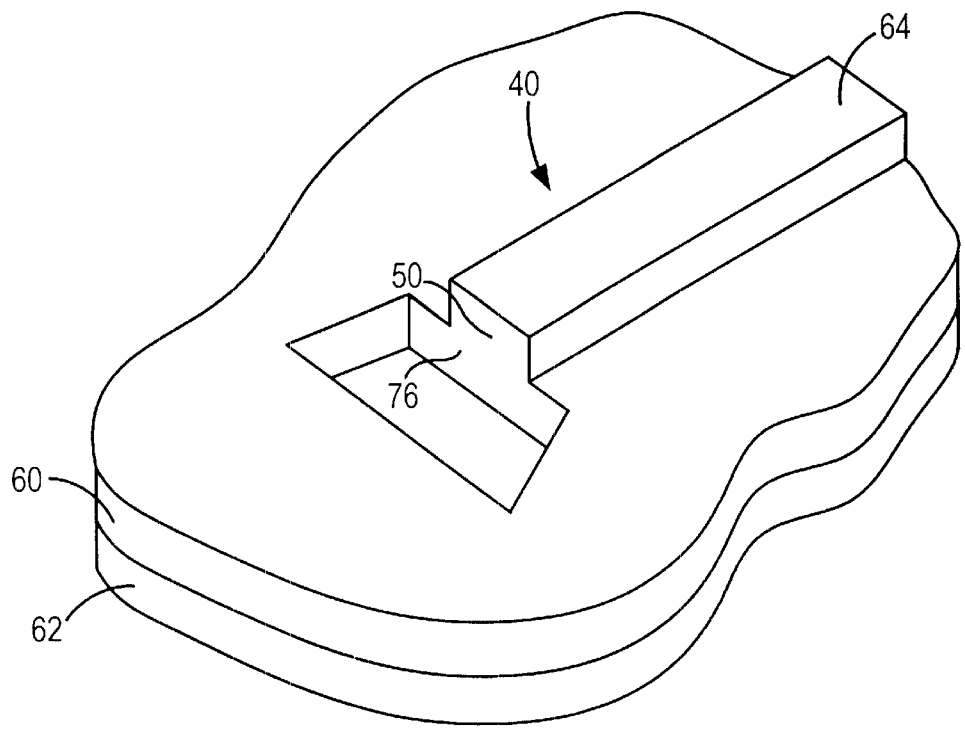
FIG. 14F illustrates a suitable construction for a reflector positioned on an array waveguide.

FIG. 14F illustrates a suitable construction of a reflector 50. The reflector 50 includes a reflecting surface 76 positioned at an end of an array waveguide 32. The reflecting surface 76 is configured to reflect light signals from an array waveguide 32 back into the array waveguide 32. The reflecting surface 76 extends below the base 62 of the ridge 64. For instance, the reflecting surface 76 can extend through the light transmitting medium 60 to the base 62 and in some instances can extend into the base 62. The reflecting surface 76 extends to the base 62 because the light signal carrying region 66 is positioned in the ridge 64 as well as below the ridge 64 as evident in FIG. 14C. As result, extending the reflecting surface 76 below the base 62 of the ridge 64 increases the portion of the light signal that is reflected. A suitable method for forming the reflector 50 is taught in U.S. patent application Ser. No. 09/723,757, filed on Nov. 28, 2000, entitled "Formation of a Reflecting Surface on an Optical Component" and incorporated herein in its entirety.

Although FIG. 9, FIG. 10 and FIG. 13 illustrate a curved transition waveguide 15, the transition waveguide can be constructed from a plurality of straight branches with a reflector 50 positioned at the intersection of the straight branches. The use of straight branches can reduce some of the complexities introduced by sharply curved waveguides.

Although many of the exemplary filters 22 illustrated above are shown with a single output waveguide 16, these filters 22 can include additional output waveguides 16 configured to serve as secondary output waveguides 18. For instance, the additional output waveguides 16 can be positioned to receive the light signals that have been filtered out by the filter 22.

Although the optical filter system 10 is described in the context of a first filter component 12A and a second filter component 12B, the advantages of the optical filter system 10 can be enhanced by constructing the optical filter system 10 with more than two filter components 12.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An optical filter system, comprising:
   a first filter having a plurality of periodically spaced pass bands separated by blocked wavelength bands; and
   a second filter configured to receive light signals output by the first filter and having a plurality of periodically spaced pass bands, the period of the pass bands associated with the first filter being different than the period of the pass bands associated with the second filter.

2. The system of claim 1, wherein the first filter or the second filter is tunable while the other filter is not tunable, the tunable filter being configured to shift a selection of wavelengths in the periodically spaced pass bands from a first selection of wavelenghts to another selection of wavelengths.

3. The system of claim 2, wherein the tunable filter is an analog filter configured to shift the selection of wavelengths in the periodically spaced pass bands.

4. The system of claim 2, wherein the first filter and the or the second filter is configured to be tuned such that a target pass band associated with the first filter and a target pass band associated with the second filter include a range of wavelengths in common while the pass bands adjacent to the target band of the first filter and the pass bands adjacent to the target band of the second filter do not include common wavelengths, the target pass band associated with the first filter being one of the periodically spaced pass bands associated with the first filter and the target pass band associated with the second filter being on of the periodically spaced pass bands associated with the second filter.

5. The system of claim 1, wherein the first filter and the second filter are independently tunable, at least one of the tunable filters being configured to shift a selection of wavelengths in the periodically spaced pass bands from a first selection of wavelengths to another selection of wavelengths.

6. The system of claim 5, wherein the first filter and the second filter are analog filters configured to shift the selection of wavelengths in the periodically spaced pass bands.

7. The system of claim 5, wherein the first filter and the and the second filter are configured to be tuned such that a target pass band associated with the first filter and a target pass band associated with the second filter include a range of wavelengths in common while the pass bands adjacent to the target pass band of the first filter and the pass bands adjacent to the target band of the second filter do not include common wavelengths, the target pass band associated with the first filter being one of the periodically spaced pass bands associated with the first filter and the target band associated with the second filter being on of the periodically spaced pass bands associated with the second filter.

8. The system of claim 1, wherein an optical fiber connects an optical component having the first filter to an optical component having the second filter, the optical fiber providing optical communication between the first filter and the second filter.

9. The system of claim 1, wherein the first filter and the second filter are positioned on the same optical component.

10. The system of claim 1, wherein the first filter includes a first array waveguide grating having a plurality of first array waveguides.

11. The system of claim 10, wherein at least a portion of the first array waveguides include an effective length tuner for changing the effective length of an array waveguide.

12. The system of claim 10, wherein an end of each first array waveguide includes a reflector for reflecting a light signal traveling toward the reflector along the first array waveguide back into the first array waveguide.

13. The system of claim 1, wherein the second filter includes a second array waveguide grating having a plurality of second array waveguides.

14. The system of claim 13, wherein at least a portion of the second array waveguides include an effective length tuner for changing the effective length of an array waveguide.

15. The system of claim 13, wherein an end of each first array waveguides includes a reflector for reflecting a light signal traveling toward the reflector along the first array waveguide back into the first array waveguide.

16. The system of claim 1, wherein the first filter is a demultiplexer and the second filter is configured to receive the demultiplexed light signals output by the first filter.

17. The system of claim 16, wherein the demultiplexer is configured to output the plurality of periodically spaced pass bands on a single waveguide.

18. The system of claim 1, wherein the range of wavelengths in the blocked wavelength bands associated with the first filter is different from the range of wavelengths in the blocked wavelength bands associated with the second filter.

19. An optical filter system, comprising:
   a first filter configured to output light signals having wavelengths falling within a plurality of periodically spaced pass bands separated by blocked wavelength bands; and
   a second filter configured to receive the light signals output by the first filter and to output light signals having wavelengths falling within a plurality of periodically spaced pass bands separated by blocked wavelength bands, the period of the pass bands associated with the first filter being different than the period of the pass bands associated with the second filter and at least one of the first filter or the second filter being configured to shift the selection of wavelengths in the periodically spaced bands across a spectrum of wavelengths.

20. The system of claim 19, wherein the first filter includes a first array waveguide grating having a plurality of first array waveguides.

21. The system of claim 20, wherein at least a portion of the first array waveguides include an effective length tuner for changing the effective length of an array waveguide.

22. The system of claim 20, wherein an end of each first array waveguides includes a reflector for reflecting a light signal traveling toward the reflector along the first array waveguide back into the first array waveguide.

23. The system of claim 19, wherein the first filter is a demultiplexer and the second filter is configured to receive the demultiplexed light signals output by the first filter.

24. The system of claim 23, wherein the demultiplexer is configured to output the plurality of periodically spaced pass bands on a single waveguide.

25. The system of claim 19, wherein the first filter and the second filter are configured to independently scan the selection of wavelengths in the periodically spaced pass bands across a spectrum of wavelengths.

26. The system of claim 19, wherein the periodically spaced pass bands associated with the first filter are separated by blocked wavelength bands.

27. The system of claim 19, wherein the periodically spaced pass bands associated with the second filter are separated by blocked wavelength bands.

28. The system of claim 19, wherein the first filter and the or the second filter is configured to shift the selection of wavelengths in the periodically spaced pass bands such that a target pass band associated with the first filter and a target pass band associated with the second filter include a range of wavelengths in common while the pass bands adjacent to the target pass band of the first filter and the pass bands adjacent to the target pass band of the second filter do not include common wavelengths, the target pass band associated with the first filter being one of the periodically spaced pass bands associated with the first filter and the target pass band associated with the second filter being on of the periodically spaced pass bands associated with the second filter.

29. The system of claim 19, wherein the first filter and the and the second filter are configured to scan the selection of wavelengths in the periodically spaced pass bands such that a target pass band associated with the first filter and a target pass band associated with the second filter include a range of wavelengths in common while the pass bands adjacent to the target pass band of the first filter and the pass bands adjacent to the target pass band of the second filter do not include common wavelengths, the target pass band associated with the first filter being one of the periodically spaced pass bands associated with the first filter and the target band associated with the second filter being on of the periodically spaced pass bands associated with the second filter.

30. A method of operating an optical filter system, comprising:
    selecting a target wavelength to be produced by an optical filter system having a first filter in optical communication with a second filter, the first filter having a plurality of periodically spaced pass bands separated by blocked wavelength bands and the second filter configured to output light signals having wavelengths that overlap with the target wavelength; and
    tuning the first filter such that a pass band of the first filter overlaps with the target wavelength.

31. The method of claim 30, wherein the second filter is not tunable.

32. The method of claim 30, wherein the first filter is configured to output light signals having wavelengths falling within a plurality of bands that are periodically spaced and are separated by blocked wavelength bands.

33. The method of claim 30, wherein the second filter is configured to output light signals having wavelengths falling within a plurality of bands that are periodically spaced and are separated by blocked wavelength bands.

34. The method of claim 30, wherein tuning the first filter includes changing the temperature of the first filter.

35. The method of claim 30, wherein the first filter includes an array waveguide grating having a plurality of array waveguides; and
    tuning the first filter includes changing an effective length of at least a portion of the array waveguides.

36. The method of claim 30, wherein the first filter includes an array waveguide grating having a plurality of array waveguides; and
    tuning the first filter includes changing an effective length of at least a portion of the array waveguides includes changing the temperature of a portion of each array waveguide in the portion of array waveguides.

37. The method of claim 30, wherein the first filter includes an array waveguide grating having a plurality of array waveguides; and
    tuning the first filter includes changing an effective length of at least a portion of the array waveguides includes passing an electrical current through a portion of each array waveguide in the portion of array waveguides.

38. A method of operating an optical filter systems comprising:
    selecting a target wavelength to be produced by the optical filter system having a first filter in optical communication with a second filter; the first filter having a plurality of periodically spaced pass bands separated by blocked wavelength bands and the second filter having a plurality of periodically spaced pass bands separated by blocked wavelength bands, the period of the pass bonds associated with the first filter being different than the period of the pass bands associated with the second filter; and
    tuning the first filter such that a pass band of the first filter overlaps with the target wavelength, wherein tuning the first filter includes shifting the selection of wavelengths included in the pass bands of the first filter.

39. The method of claim 38, wherein tuning the first filter includes changing a temperature of an optical component having the first filter and tuning the second filter includes changing a temperature of an optical component having the second filter.

40. The method of claim 38, wherein the first filter includes an array waveguide grating having a plurality of array waveguides; and
    tuning the first filter includes changing an effective length of at least a portion of the array waveguides.

41. The method of claim 38, wherein the first filter includes an array waveguide grating having a plurality of array waveguides; and
    tuning the first filter includes changing an effective length of at least a portion of the array waveguides includes changing the temperature of a portion of each array waveguide in the portion of array waveguides.

42. The method of claim 38, wherein the first filter includes an array waveguide grating having a plurality of array waveguides; and
    tuning the first filter includes changing an effective length of at least a portion of the array waveguides includes passing an electrical current through a portion of each array waveguide in the portion of array waveguides.

* * * * *